US012554989B2

(12) United States Patent
Nguyen et al.

(10) Patent No.: US 12,554,989 B2
(45) Date of Patent: Feb. 17, 2026

(54) DEEP SURROGATE LANGEVIN SAMPLING FOR MULTI-OBJECTIVE CONSTRAINT BLACK BOX OPTIMIZATION WITH APPLICATIONS TO OPTIMAL INVERSE DESIGN PROBLEMS

(71) Applicants: International Business Machines Corporation, Armonk, NY (US); Massachusetts Institute of Technology, Cambridge, MA (US)

(72) Inventors: Thanh Van Nguyen, Bellevue, WA (US); Youssef Mroueh, New York, NY (US); Samuel Chung Hoffman, New York, NY (US); Payel Das, Yorktown Heights, NY (US); Pierre L. Dognin, White Plains, NY (US); Giuseppe Romano, Cambridge, MA (US); Chinmay Hegde, New York, NY (US)

(73) Assignees: International Business Machines Corporation, Armonk, NY (US); Massachusetts Institute of Technology, Cambridge, MA (US)

( * ) Notice: Subject to any disclaimer, the term of this patent is extended or adjusted under 35 U.S.C. 154(b) by 970 days.

(21) Appl. No.: 17/008,197

(22) Filed: Aug. 31, 2020

(65) Prior Publication Data
US 2022/0076130 A1    Mar. 10, 2022

(51) Int. Cl.
*G06N 3/08*        (2006.01)
*G06N 3/04*        (2023.01)
*G06N 3/086*       (2023.01)

(52) U.S. Cl.
CPC ............... *G06N 3/086* (2013.01); *G06N 3/04* (2013.01)

(58) Field of Classification Search
CPC .................................. G06N 3/086; G06N 3/04
(Continued)

(56) References Cited

U.S. PATENT DOCUMENTS

| 9,626,635 B2 | 4/2017 | Ogawa et al. |
| 2019/0034802 A1 | 1/2019 | Harshangi et al. |

(Continued)

FOREIGN PATENT DOCUMENTS

| EP | 3559867 A1 | 10/2019 |
| EP | 4120136 A1 * | 1/2023 |

OTHER PUBLICATIONS

Girolami, et al., "Riemann manifold Langevin and Hamiltonian Monte Carlo methods", J.R. Statist.Soc.B (2011) 73, Part 2, pp. 123-214 (Year: 2011).*

(Continued)

*Primary Examiner* — Tsu-Chang Lee
(74) *Attorney, Agent, or Firm* — Caleb Wilkes; Otterstedt & Kammer PLLC

(57) ABSTRACT

Run a computerized numerical partial differential equation solver on at least one partial differential equation representing at least one physical constraint of a physical system, to generate a training data set. A true potential corresponds to an exact solution to the at least one partial differential equation. Using a computerized machine learning system, learn, from the training data set, a surrogate of a gradient of the true potential. Using the computerized machine learning system, apply Langevin sampling to the learned surrogate of the gradient, to obtain a plurality of samples corresponding to candidate designs for the physical system. Make the plurality of samples available to a fabrication entity.

9 Claims, 12 Drawing Sheets

1101

▶ Learning phase: Fit a deep surrogate model $f_\theta(x)$ on data

1103

▶ Sampling phase: Obtain the surrogate gradient $\nabla_x f_\theta(x)$ $G(x) = \nabla_x f_\theta(x)$
Surrogate Model $f_\theta(x)$

(58) Field of Classification Search
USPC .......................................................... 706/13
See application file for complete search history.

(56) References Cited

U.S. PATENT DOCUMENTS

| | | | |
|---|---|---|---|
| 2019/0147369 A1 | 5/2019 | Gupta et al. | |
| 2019/0197403 A1 | 6/2019 | Schmidhuber | |
| 2019/0197404 A1* | 6/2019 | Wang | G06N 3/04 |
| 2020/0042901 A1 | 2/2020 | Chen et al. | |
| 2020/0065682 A1 | 2/2020 | Paulina et al. | |
| 2020/0257933 A1* | 8/2020 | Steingrimsson | G16C 20/70 |

OTHER PUBLICATIONS

Shi, et al., "Hermite learning with gradient data", Journal of Computational and Applied Mathematics 233 (2010) 3046-3059 (Year: 2010).*

Bubeck, et al., "Finite-Time Analysis of Projected Langevin Monte Carlo", Advances in Neural Information Processing 28 (NIPS 2015) (Year: 2015).*

Wibisono, et al., "Proximal Langevin Algorithm: Rapid Convergence Under Isoperimetry", arXiv: 1911.01469v1 [stat.ML] Nov. 4, 2019 (Year: 2019).*

Darve, et al., "Computing generalized Langevin equations and generalized Fokker-Planck equations", PNAS, vol. 106, No. 27, Jul. 7, 2009 (Year: 2009).*

[0002] Thanh Van Nguyen, Youssef Mroueh, Samuel Chung Hoffman, Payel Das, Pierre L. Dognin, Giuseppe Romano, and Chinmay Hegde, Surrogate-Based Constrained Langevin Sampling With Applications to Optimal Material Configuration Design, Sep. 25, 2019 ICLR 2020 Conference Blind Submission. Grace Period Disclosure. 8 Pages Biblio Material Plus pp. 1-20.

Thanh Van Nguyen, Youssef Mroueh, Samuel Chung Hoffman, Payel Das, Pierre L. Dognin, Giuseppe Romano, and Chinmay Hegde, Surrogate-Based Constrained Langevin Sampling With Applications to Optimal Material Configuration Design, Dec. 24, 2019 ICLR 2020 Conference Blind Submission. Grace Period Disclosure. 8 Pages Biblio Material Plus pp. 1-20.

Brosse et al., Sampling from a log-concave distribution with compact support with proximal langevin monte carlo. In Conference on Learning Theory, pp. 319-342, May 2017.

Bubeck et al., Finite-time analysis of projected langevin monte carlo. In Advances in Neural Information Processing Systems, pp. 1243-1251, 2015.

Chehouri et al., A constraint-handling technique for genetic algorithms using a violation factor. arXiv preprint arXiv: 1610.00976, Oct. 2016.

Chen, Nanoscale energy transport and conversion: a parallel treatment of electrons, molecules, phonons, and photons. Oxford University Press, USA, Mar. 2005 - Table of Contents.

Chen et al., Toward black-box sampling: A random-direction interior-point markov chain approach. Journal of Computational and Graphical Statistics, 7(1):1-22, Mar. 1998.

Czarnecki et al., Sobolev training for neural networks. In Advances in Neural Information Processing Systems 30, op. 4278-4287. 2017.

Dai et al., Kernel exponential family estimation via doubly dual embedding. In The 22nd International Conference on Artificial Intelligence and Statistics, Apr. 2019 (pp. 2321-2330), PMLR.

Dalalyan et al., Sparse regression learning by aggregation and langevin montecarlo, J. Comput. Syst. Sci., bp. 1423-1443, Sep. 2012.

Dalalyan, Theoretical guarantees for approximate sampling from smooth and log-concave densities. Journal of the Royal Statistical Society: Series B (Statistical Methodology), 79(3): 651-676, 2017.

Duchi et al., Optimal rates for zero-order convex optimization: The power of two function evaluations. IEEE Transactions on Information Theory, 61(5):2788-2806, Mar. 2015.

Durmus et al., High-dimensional bayesian inference via the unadjusted langevin algorithm. Bernoulli, 25(4A):2854-2882, Nov. 2019.

Frazier, A tutorial on bayesian optimization. arXiv preprint arXiv:1807. 02811, Jul. 2018.

Ganchev et al., Posterior regularization for structured latent variable models. Journal of Machine Learning Research, 11(Jul.):2001-2049, 2010.

Ghadimi et al., Stochastic first-and zeroth-order methods for nonconvex stochastic programming. SIAM Journal on Optimization, 23(4):2341-2368, 2013.

Gomez-Bombarelli et al., Automatic chemical design using a data-driven continuous representation of molecules. ACS central science, 4(2):268-276, Feb. 2018.

Tan et al., Stein variational gradient descent without gradient. In Proceedings of the 35th International Conference on Machine Learning, pp. 1900-1908, Jun. 2018.

Hernandez-Lobato et al., A general framework for constrained bayesian optimization using information based search. Journal of Machine Learning Research, 17(160): 1-53, Sep. 2016.

Hsieh et al., Mirrored langevin dynamics. In Advances in Neural Information Processing Systems, pp. 2878-2887, 2018.

Hu et al., Deep generative models with learnable knowledge constraints. In Advances in Neural Information Processing Systems, p. 10501-10512, 2018.

Hyvarinen, Estimation of non-normalized statistical models by score matching, Journal of Machine Learning Research, Apr. 2005;6 pp. 695-709.

Jennings et al., Genetic algorithms for computational materials discovery accelerated by machine learning. npj Computational Materials, 5(1):46, Apr. 2019.

Jones et al., Efficient global optimization of expensive black-box functions. Journal of Global optimization, 13(4):455-192, Dec. 1998.

Li et al., Gradient estimators for implicit models. arXiv preprint arXiv:1705.07107, May 2017.

Stochastic process, Wikipedia, pp. 1-41 downloaded Feb. 5, 2023 from https://en.wikipedia.org/wiki/Stochastic_process.

Mockus, Application of bayesian approach to numerical methods of global and stochastic optimization. Journal of Global Optimization, 4(4):347-365, Jun. 1994, abstract and citations.

Mukherjee et al., Estimation of gradients and coordinate covariation in classification, J. Mach. Learn. Res., Nov. 2006, pp. 2481-2514.

Mukherjee et al., Learning coordinate covariances via gradients. J. Mach. Learn. Res., Mar. 2006, pp. 519-549.

Radford, Slice sampling. The Annals of Statistics, 31, Jun. 2003, pp. 705-741.

Nesterov et al., Random gradient-free minimization of convex functions. Found. Comput. Math., 2017.

Romano et al., Multiscale electrothermal modeling of nanostructured devices. IEEE Trans. Nanotechnol., 10(6): 1285 1292, Apr. 2011 abstract.

Romano et al., Heat conduction in nanostructured materials predicted by phonon bulk mean free path distribution. J. Heat Transf., 137(7): 071302, Jul. 2015.

Romano et al., Tuning thermal transport in disordered porous materials via phonon bottleneck identification. Phys. Rev. B, 1:3434, 2016.

Shen et al., Non-asymptotic results for langevin monte carlo: Coordinate-wise and black-box sampling. arXiv preprint arXiv: 1902.01373, Mar. 2019.

Shi et al., Hermite learning with gradient data. J. Comput. Appl. Math., Apr. 2010.

Srinivas et al., Knowledge transfer with jacobian matching. arXiv preprint arXiv:1803.00443, Mar. 2018.

The MIT Development Group, SIGMA mit, a scalable computational framework for large-scale simulation of complex mechanical response of materials, 2018, downloaded Feb. 5, 2023 pp. 1-2 from summit.mit.edu.

Suzuki et al., Multi objective Bayesian optimization using pareto-frontier entropy. arXiv preprint arXiv:1906.00127, Jun. 2019.

Wu et al., Learning gradients: Predictive models that infer geometry and statistical dependence. J. Mach. Learn. Res., Aug. 2010, pp. 2175-2198.

Zhou et al., Optimization of molecules via deep reinforcement learning. Scientific reports, 9(1): 10752, Jul. 2019.

(56) References Cited

OTHER PUBLICATIONS

Neal, R. M. Slice sampling. The Annals of Statistics, 31, 2003. pages 705-767.
Balandat, M., Karrer, B., Jiang, D. R., Daulton, S., Letham, B., Wilson, A. G., and Bakshy, E. Botorch: Programmable bayesian optimization in pytorch. arXiv preprint arXiv:1910.06403, 2019. 15 pages.
Schonlau, M. Computer experiments and global optimization. 1997. University of Waterloo thesis 1-131 plus front material.
Peter Mell and Timothy Grance, The NIST Definition of Cloud Computing, NIST special pub. 800-145, Sep. 2011 7 pages.
Alain Durmus, Eric Moulines, et al. Nonasymptotic convergence analysis for the unadjusted 303 langevin algorithm. The Annals of Applied Probability, 27(3):1551-1587, 2017.
Giuseppe Romano. Openbte: A multiscale solver for the phonon boltzmann transport equation. 330 In APS Meeting Abstracts, 2019. abstract 1 page.

\* cited by examiner

| | Method | ∇f given | Best value | No. train samples | Sam. time (s) |
|---|---|---|---|---|---|
| Oracle | Exact-PLMC | ✓ | 3.0 | ✗ | 20.6 |
| Baseline | BO | ✗ | 3.0383 | 1K | 387.6 |
| Ours | Zero-order-PLMC | ✗ | 3.0002 | ✗ | 6.6 |
| | Taylor-Reg-PLMC | ✗ | 3.0004 | 10K | 19.6 |
| | Taylor-1-PLMC | ✗ | 5.0863 | 10K | 19.4 |
| | Z-Hermite-PLMC | ✗ | 3.0004 | 10K | 20.2 |

*FIG. 4*

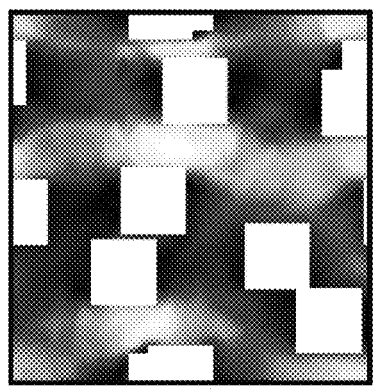

$\kappa = 0.0871$
$\sigma = 0.4826$
*FIG. 5A*

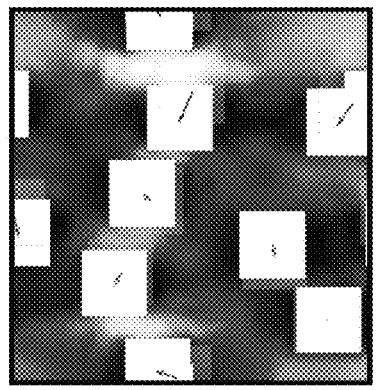

$\kappa = 0.0802$
$\sigma = 0.6681$
*FIG. 5B*

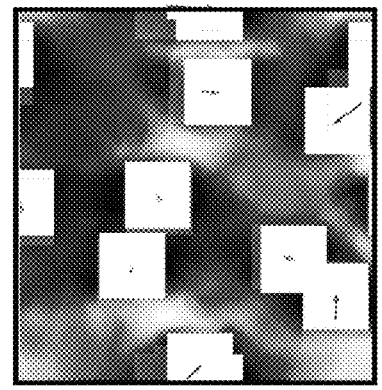

$\kappa = 0.0732$
$\sigma = 0.4401$
*FIG. 5C*

| | Model | Min κ / Resp. σ | Min κ / Resp. satisfied σ | Time (s) |
|---|---|---|---|---|
| Baseline | Bayesian Opt | 0.0552 / 0.5933 | 0.0846 / 0.4655 | 1614 |
| Ours | Taylor-Reg-PLMC | 0.0613 / 1.4037 | 0.0732 / 0.4401 | 952 |
| | Taylor-1-PLMC | 0.0544 / 0.8004 | 0.0963 / 0.4677 | 852 |
| | Zero-order-PLMC | 0.0471 / 0.5594 | 0.0697 / 0.4764 | 15677 |
| | Taylor-Reg-ProxLMC | 0.0639 / 0.8789 | 0.0666 / 0.4467 | 856 |
| | Taylor-1-ProxLMC | 0.0548 / 0.6549 | 0.0876 / 0.4481 | 972 |
| | Zero-order-ProxLMC | 0.0354 / 0.6471 | 0.0808 / 0.4991 | 15080 |

*FIG. 6*

$\kappa = 0.0871, \sigma = 0.4826$ $\kappa = 0.0834, \sigma = 0.4638$ $\kappa = 0.0942, \sigma = 0.4566$ $\kappa = 0.0871, \sigma = 0.4826$ $\kappa = 0.0834, \sigma = 0.4638$ $\kappa = 0.0942, \sigma = 0.4566$

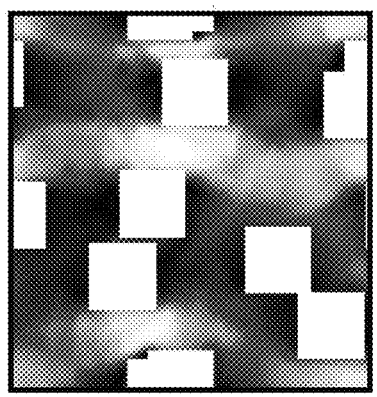 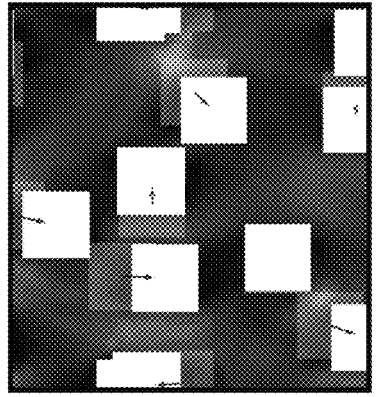 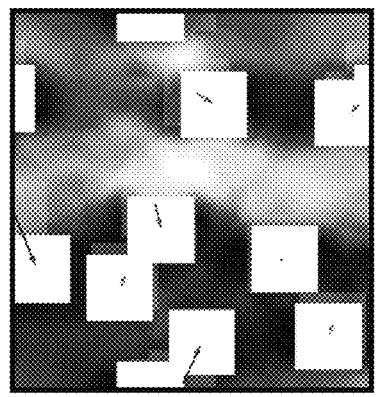
Random sample  
$\kappa = 0.0871, \sigma = 0.4826$
Zeroth ProxLMC with  
$\kappa = 0.0719, \sigma = 0.4424$
Zeroth ProxLMC $\kappa, \sigma$  
$\kappa = 0.1074, \sigma = 0.5110$
*FIG. 12A*  *FIG. 12B*  *FIG. 12C*
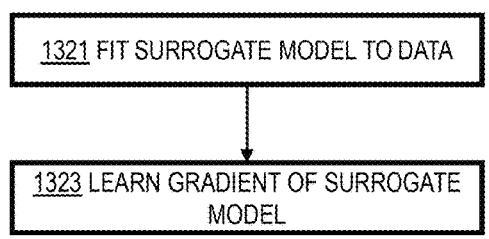
*FIG. 14*

DEEP SURROGATE LANGEVIN SAMPLING FOR MULTI-OBJECTIVE CONSTRAINT BLACK BOX OPTIMIZATION WITH APPLICATIONS TO OPTIMAL INVERSE DESIGN PROBLEMS

STATEMENT REGARDING PRIOR DISCLOSURES BY THE INVENTOR OR A JOINT INVENTOR

The following disclosure(s) are submitted under 35 U.S.C. 102(b)(1)(A):

Thanh Van Nguyen, Youssef Mroueh, Samuel Chung Hoffman, Payel Das, Pierre L. Dognin, Giuseppe Romano, and Chinmay Hegde, SURROGATE-BASED CONSTRAINED LANGEVIN SAMPLING WITH APPLICATIONS TO OPTIMAL MATERIAL CONFIGURATION DESIGN, 25 Sep. 2019 ICLR 2020 Conference Blind Submission.

Thanh Van Nguyen, Youssef Mroueh, Samuel Chung Hoffman, Payel Das, Pierre L. Dognin, Giuseppe Romano, and Chinmay Hegde, SURROGATE-BASED CONSTRAINED LANGEVIN SAMPLING WITH APPLICATIONS TO OPTIMAL MATERIAL CONFIGURATION DESIGN, 24 Dec. 2019 ICLR 2020 Conference Blind Submission.

BACKGROUND

The present invention relates to the electrical, electronic and computer arts, and more specifically, to machine learning and the like.

Making inference on Gibbs distributions or energy-based models is a problem of significant importance in statistics and machine learning. Unfortunately, the exact inference can be computationally expensive due to intractable partition functions. In such scenarios, one needs to resort to approximate sampling. A more challenging setting arises where the Gibbs distribution has unknown log density or potential. In other words, the density can only be evaluated for each point in its support. This is referred to as black-box sampling.

This problem arises in the context of physical inverse design where it is desired to create a simulator or a sampler that produces a diverse set of designs satisfying multiple constraints. The constraint functions that constitute the potential are solutions to Partial Differential Equations (PDEs) obtained via black-box numerical solvers. These solvers are often complex, expensive to evaluate, and offer no access to the inner variables or the gradients.

Similar to black-box optimization, where the black-box nature prevents the use of gradient-based methods, black-box sampling faces the same problem. The first common approach is based on finite differences using Gaussian smoothing (or zero-order methods) to estimate gradients and then using Langevin dynamics for sampling. However, one notable shortcoming of these approaches is the computational cost of repeatedly querying the black-box functions.

SUMMARY

Principles of the invention provide techniques for deep surrogate Langevin sampling for multi-objective constraint black box optimization with applications to optimal inverse design problems. In one aspect, an exemplary method includes running a computerized numerical partial differential equation solver on at least one partial differential equation representing at least one physical constraint of a physical system, to generate a training data set, wherein a true potential corresponds to an exact solution to the at least one partial differential equation; using a computerized machine learning system, learning, from the training data set, a surrogate of a gradient of the true potential; using the computerized machine learning system, applying Langevin sampling to the learned surrogate of the gradient, to obtain a plurality of samples corresponding to candidate designs for the physical system; and making the plurality of samples available to a fabrication entity.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide:

inverse design for a nanomaterial or the like with less CPU time than prior techniques using a numerical solver to solve PDEs;

more rapid development of a final physical design such as for a nano-material;

ability to rank a plurality of candidate designs for a nanomaterial or the like.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 is a table of exemplary results according to embodiments of the present invention;

FIGS. 5A, 5B, and 5C depict exemplary results for nano-porous structures according to embodiments of the present invention;

FIG. 6 is a table of exemplary samples according to embodiments of the present invention;

FIGS. 12A, 12B, and 12C depict exemplary results for nano-porous structures according to embodiments of the present invention;

FIGS. 13 and 14 are flow charts of an exemplary method according to embodiments of the present invention;

DETAILED DESCRIPTION

Figure 1:
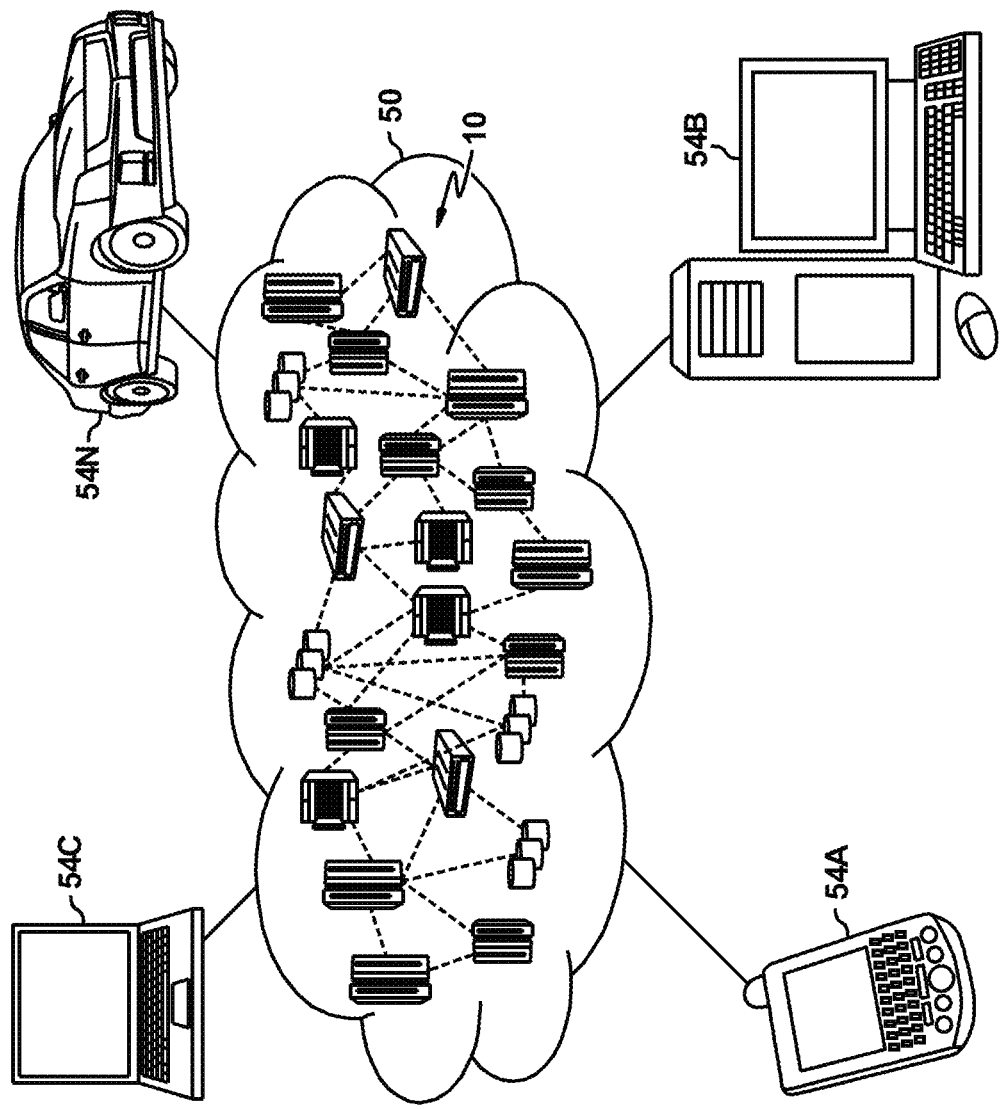
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
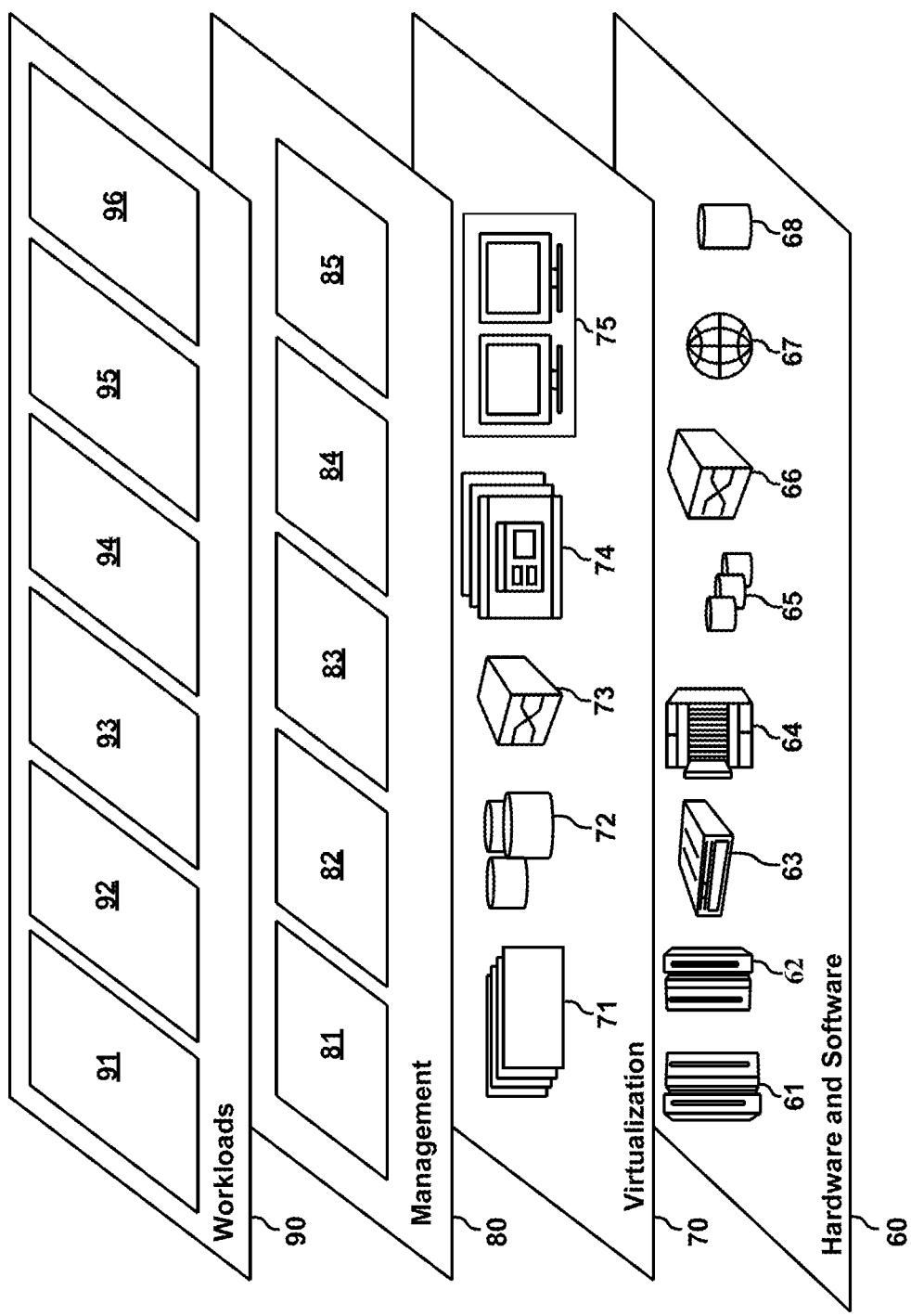
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to provide deep surrogate Langevin sampling for multi-objective constraint black box optimization with applications to optimal inverse design problems and the like.

One or more embodiments address the problem of sampling from a Gibbs distribution with a black-box potential. Such a setting is encountered, for example, in physical inverse design where the potential is specified as a solution to a complex partial differential equations (PDEs). A significant challenge is that the energy potential can typically only be evaluated point-wise and has no explicit form. To overcome this, one or more embodiments provide a black-box sampling strategy using Langevin dynamics with surrogate gradients. While zero-order methods can approximate the potential gradient for Langevin sampling, they are expensive due to the cost of evaluating the energy online. One or more embodiments provide a technique that learns the potential gradient using deep neural networks, leading to an efficient sampling strategy. One or more embodiments of surrogate sampling converge when the target Gibbs distribution is log-concave and smooth. Non-limiting experimental results are shown herein demonstrating the usability of one or more embodiments on two synthetic examples and in black-box optimization nano-configuration design.

As noted above, making inference on Gibbs distributions or energy-based models is a problem of significant importance in statistics and machine learning. Unfortunately, the exact inference can be computationally expensive due to intractable partition functions. In such scenarios, one needs to resort to approximate sampling. A more challenging setting arises where the Gibbs distribution has unknown log density or potential. In other words, the density can only be evaluated for each point in its support. This is referred to as black-box sampling.

This problem arises, for example, in the context of physical inverse design where it is desired to create a simulator or a sampler that produces a diverse set of designs satisfying multiple constraints. The constraint functions that constitute the potential are solutions to Partial Differential Equations (PDEs) obtained via black-box numerical solvers. These solvers are often complex, expensive to evaluate, and offer no access to the inner variables or the gradients.

Similar to black-box optimization, where the black-box nature prevents the use of gradient-based methods, black-box sampling faces the same problem. The first common approach is based on finite differences using Gaussian smoothing (or zero-order methods) to estimate gradients and then using Langevin dynamics for sampling. However, one notable shortcoming of these approaches is the computational cost of repeatedly querying the black-box functions.

One or more embodiments provide a Langevin approach for sampling from Gibbs distributions with black box potential. To overcome the computational issue of zero-order methods, one or more embodiments introduce a data-driven strategy, namely, Surrogate Langevin Monte-Carlo (S-LMC) for sampling. S-LMC includes two steps: first, learn from data a surrogate of the gradient of the potential of the Gibbs distribution. Since access to data from the target Gibbs distribution is not available, one or more embodiments use samples generated offline from a prior distribution and corresponding evaluated potentials for training the surrogate model. Several objective functions, as well as deep neural-network parameterization to for learning, are presented herein.

Next, one or more embodiments use the surrogate model in the (constrained) Langevin dynamics in lieu of the black-box potential. Using the surrogate enables more efficient sampling since it avoids expensive queries (such as PDE forward solvers); moreover, obtaining the gradient is as efficient as evaluating the learned function by automatic differentiation. To summarize, one or more embodiments provide one, some, or all of the following:

a. A Surrogate Langevin Monte Carlo for black-box sampling by learning the gradient of the Gibbs potential using deep neural networks, which converges to the target distribution. When the distribution is supported on a compact domain, the surrogate can be used in conjunction with projection or proximal methods. Theoretical guarantees are presented herein for S-LMC via Hermite and Taylor learning.

b. One exemplary application of one or more embodiments is for multi-constraint black-box optimization in physical inverse design, casting the problem of optimizing a target function under constraints as sampling from a Gibbs distribution and using S-LMC for finding candidate designs.

c. The effectiveness of one or more embodiments in sampling from a mixture of Gaussians, optimizing a benchmark black box function and in the design of nano-porous configurations with improved thermoelectric efficiency and mechanical stability. Favorable results of one or more embodiments over Bayesian Optimization, a standard method in the optimization toolbox, are demonstrated herein.

Background on Langevin Sampling

One or more embodiments sample from the following Gibbs distribution with black-box potential U(x):

$$\pi(x) = \frac{1}{Z}\exp(-U(x))\mathbf{1}_{x\in\Omega}, \Omega \subseteq \mathbb{R}^d. \qquad (1)$$

In the white-box setting where U(x) has an analytic form, Langevin dynamics is a well-known MCMC method to sample from π, and its mixing properties have been actively studied, assuming certain conditions on U(x). Consider the following assumptions:

Assumption A: Ω is a convex set in $\mathbb{R}^d$ such that $0 \in \Omega$. Assume that Ω contains and is contained in Euclidean balls of radius r and R, respectively. The projection onto Ω is defined as $P_\Omega(x) = \arg\min_{x' \in \Omega} \|x - x'\|^2$ for each $x \in \Omega$. Here, $\|.\|$ denotes the Euclidean norm.

Assumption B: Assume that U is convex, β-smooth, and with bounded gradients:

$$\|\nabla_x U(x) - \nabla_y U(y)\| \le \beta \|x - y\|, \forall x, y \in \Omega;$$

$$\|\nabla U(x)\| \le L, \forall x \in \Omega.$$

These assumptions are standard in Langevin sampling analysis. One or more embodiments use Total Variation (TV) distance between measures μ, ν, which is TV(μ, ν)=$\sup_A |\mu(A) - \nu(A)|$. TV can be controlled by Kullback-Leibler divergence via the Pinsker Inequality: TV(μ, ν)≤$\sqrt{2KL(\mu,\nu)}$. There are two provable approaches for constrained Langevin sampling:

Projected Langevin dynamics. Projected Langevin Monte Carlo (PLMC) has been introduced in the literature and had its mixing properties proven towards the stationary distribution π. PLMC is given by the following:

PLMC: $X_{k+1} = P_\Omega(X_k - \eta \nabla_x U(X_k) + \sqrt{2\lambda\eta}\xi_k)$, k=0 ... K−1. (2)

Proximal Langevin dynamics. Similar to proximal methods for optimization, Proximal LMC (ProxLMC) has been introduced in the literature and uses the iteration for k=0 ... K−1:

ProxLMC:
$$X_{k+1} = \left(1 - \frac{\eta}{\gamma}\right)X_k - \eta\nabla_x U(X_k) + \frac{\eta}{\gamma}P_\Omega(X_k) + \sqrt{2\lambda\eta}\xi_k \qquad (3)$$

In the above, η is the step size and γ is a regularization parameter. Essentially, ProxLMC performs ordinary Langevin dynamics on $U^\gamma(x) = U(x) + i_\Omega^\gamma(x)$, where:

$$i_\Omega^\gamma(x) = \inf_y i_\Omega(x) + (2\gamma)^{-1}\|x - y\|^2 = (2\gamma)^{-1}\|x - P_\Omega(x)\|^2$$

is the proximal operator and $i_\Omega(x)=0$ for $x \in \Omega$ and $i_\Omega(x)=0$ for $x \in \Omega$. Under Assumptions A and B, both methods converge to the target Gibbs distribution π in the total variation distance, with the mixing time $K = \tilde{\Omega}(\epsilon^{-12}d^{12})$ (Projected Langevin dynamics of Eq. 2) and $K = \tilde{\Omega}(\epsilon^{-6}d^{5})$ (Proximal Langevin dynamics of Eq. 3, showing improvement of Proximal ($d^5$) versus Projected ($d^{12}$)).

Surrogate Langevin Sampling

One or more embodiments address the challenging black-box setting where the potential gradient $\nabla_x U$ is not available. To this end, two exemplary methods are disclosed herein for approximating the gradient of U by (i) using a zero-order approach and (ii) learning a surrogate deep model. The convergence result(s) and discussion of the zero-order approach are discussed below.

Replacing the unknown gradient $\nabla_x U$ with the surrogate G(.), construct the surrogate Langevin sampling (S-LMC), with two variants:

$$S\text{-}PLMC: Y_{k+1} = P_\Omega(Y_k - \eta G(Y_k) + \sqrt{2\lambda\eta}\xi_k), k = 0 \ldots K-1 \qquad (4)$$

$$S\text{-}ProxLMC: Y_{k+1} = \left(1 - \frac{\eta}{\gamma}\right)Y_k - \eta G(Y_k) + \frac{\eta}{\gamma}P_\Omega(Y_k) + \sqrt{2\lambda\eta}\xi_k.$$

Let $\mu_k^{PLMC} = \mathcal{L}_k^{PLMC}(X_k)$ and $\mu_k^{ProxLMC} = \mathcal{L}_k^{ProxLMC}(X_k)$ be the distributions of $X_k$ generated by the respective diffusion processes in Eq. 2 and Eq. 3. Similarly, let $\mu_k^{SPLMC} = \mathcal{L}_k^{SPLMC}(Y_k)$ and $\mu_k^{SProxLMC} = \mathcal{L}_k^{SProxLMC}(Y_k)$ given in Eq. 4 and Eq. 5. The first result is on the approximation guarantee of the surrogate LMC (S-PLMC, and S-ProxLMC) to the versions with gradient oracle:

Theorem 1. Suppose the surrogate gradient G satisfies $\mathbb{E}\|G(Y_k)\|^2 < \infty, \forall k \ge 0$ and $R = \sup_{x,x' \in \Omega}\|x - x'\| < \infty$.

We have

1. S−PLMC convergence.

$$TV^2\left(\mu_k^{S-PLMC}, \mu_k^{PLMC}\right) \le \frac{\eta}{\lambda}\sum_{k=0}^{K-1}\mathbb{E}\|G(Y_k) - \nabla_x U(Y_k)\|^2 + K\beta^2 R^2.$$

2. S−ProxLMC convergence.

$$TV^2\left(\mu_k^{S-ProxLMC}, \mu_k^{ProxLMC}\right) \le \frac{\eta}{2\lambda}\sum_{k=0}^{K-1}\mathbb{E}\|G(Y_k) - \nabla_x U(Y_k)\|^2.$$

The proof of Theorem 1 is presented below. Theorem 1 is an application of a technique in Stochastic Differential Equations that is mainly based on a variant of Girsanov's Theorem for change of measures and Pinsker's Inequality to bound total variation in terms of Kullback-Leibler divergence. Intuitively, Theorem 1 suggests that a good surrogate gradient of $\nabla_x U(X)$ enables the convergence of the surrogate Langevin sampling approach. The next section presents surrogate learning methods to achieve $\mathbb{E}\|G(Y_k)-\nabla_x U(Y_k)\|^2 \leq \delta$.

Surrogate Learning

This section introduces a data-driven approach for learning a surrogate model of the true potential. The approach relies upon the framework of Hermite learning and Taylor learning. Since Hermite learning requires the availability of gradient data (obtained by either finite difference or adjoint methods), this part focuses on Taylor learning, with information on Hermite learning provided below.

The question of where the training data come from is pertinent in one or more embodiments. In fact, the difficulty in the black-box sampling is also that there is no access to any data that come from the target Gibbs distribution to learn a generative model or estimate the score function. Instead, draw many samples x offline from a prior distribution $p(x)$ supported on $\Omega$ and generate $y=U(x)$.

Taylor learning of gradients: One or more embodiments leverage the Taylor learning framework of gradients. One or more embodiments learn a surrogate potential $f_\theta$ and gradient $G_\Lambda$ that are consistent with the first-order Taylor expansion. Given a training set $S=\{(x_i, y_i=U(x_i)), x \sim p_\Omega, i=1 \ldots N\}$ formulate the following objective:

$$\text{Taylor-2:} \min_{\substack{f_\theta \in H_0 \\ G_\Lambda \in H_\Lambda^d}} \frac{1}{N^2} \sum_{i,j} w_{i,j}^\sigma (y_i - f_\theta(x_j) + \langle G_\Lambda(x_i), x_j - x_i \rangle)^2 \quad (6)$$

In the above, $$w_{i,j}^\sigma = \exp\left(\frac{-\|x_i - x_j\|^2}{\sigma^2}\right), H_\theta$$

is an RKHS ball of scalar valued functions, and $\mathcal{H}_\Lambda^d$ is an RKHS ball of vector valued functions. Under mild assumptions, for $N=O(1/\epsilon^{d/2})$ obtain:

$\int_\Omega \|G_\Lambda(x)-\nabla_x U(x)\|^2 p_\Omega(x) dx \leq \epsilon$.

Simplify the problem in Eq. 6 and utilize the following two objective functions and leverage a deep learning toolkit to parameterize the surrogate $f_\theta$:

$$\text{Taylor-1:} \min_{f_\theta \in H_0} \frac{1}{N^2} \sum_{i,j} w_{i,j}^\sigma (y_i - f_\theta(x_j) + \langle \nabla_x f_\theta(x_i), x_j - x_i \rangle)^2 \quad (7)$$

and the regression with regularization based on the first order Taylor expansion:

$$\text{Taylor-Reg:} \min_{f_\theta \in H_\theta} \frac{1}{N} \sum_{i=1} (y_i - f_\theta(x_i))^2 + \quad (8)$$

$$\frac{\lambda}{N^2} \sum_{i,j} w_{i,j}^\sigma (y_i - y_j + \langle \nabla_x f_\theta(x_i), x_j - x_i \rangle)^2.$$

The objective in Eq. 7 essentially takes advantage of the deep learning framework where the backward computation is efficient. Meanwhile, the objective in Eq. 8 is similar in spirit to the Jacobian matching formulation in the sense that the regularization forces the surrogate gradient to be consistent with the first-order Taylor expansion around the neighborhood of each training data point. The advantage of Taylor learning over Hermite learning is that it is not required to perform zero-order estimation or adjoint operations to construct the training set. The first-order approximation is good for a sufficiently smooth target function.

Convergence Guarantees of S-LMC

Refer again to the above discussion of surrogate learning. One or more embodiments employ Langevin sampling (S-LMC). S-LMC includes two steps: (i) first, learn, using training data, a surrogate of the gradient of the potential of the Gibbs distribution; and (ii) $G(x)=\nabla_x f_\theta(x)$ in the constrained Langevin dynamics in Eqs. 4 and 5. Use the surrogate model in the constrained Langevin dynamics in lieu of the black-box potential.

Consider the surrogate model $f_\theta$ obtained via Taylor learning (Eqs. 6, 7, 8) or Hermite learning (Eq. 15). Taylor learning comes with theoretical guarantees when the approximation function space is an RKHS under some mild assumptions on the training distribution and the regularity of the target function U. In Taylor Learning with the objective function given in Eq. 6:

$$\mathbb{E}_{x \sim p_\Omega} \|G_\Lambda(x)-\nabla_x U(x)\|^2 \leq \epsilon \text{ for } N=O(1/\epsilon^{d/2}).$$

In order to apply Theorem 1, this gradient approximation error should hold in expectation on all intermediate distributions in the Langevin sampling. Hence, employ additional assumptions on $G(x)$ and the training distribution $p_\omega$:

Assumption C. The surrogate gradient G satisfies $G(x)<\infty$, $\forall x \in \Omega$.

Assumption D: Assume a learned surrogate G on training distribution $p_\Omega$ such that $\mathbb{E}_{x \sim p_\Omega}\|G(x)-\nabla_x U(x)\|^2 \leq \delta$. Assume $p_\Omega(x)>0$, $\forall x \in \Omega$ and that it is a dominating measure of Langevin (PLMC, S-PLMC, Prox-LMC, S-ProxLMC) intermediate distributions $\mu_k$:

$\exists C>0: \mu_k(x) \leq C p_\Omega(x), \forall x \in \Omega, \forall k=0, \ldots K-1$ Remark 1. Since G is the gradient of a neural network, and $\Omega$ is a bounded compact domain, a well regularized network has bounded weights, and hence the gradient norm is finite. Assumption D on the $\epsilon$-approximation of the gradient can be achieved for a large enough training set N, using Hermite learning in RKHS under mild assumptions and in Taylor learning. The assumption on the dominance of the training distribution is natural and means that a large training set, which accounts for what may be encountered in S-LMC iterations, is appropriate.

Under Assumption D, $\mathbb{E}\|G(X_k)-\nabla U(X_k)\|^2$ is equal to $$\int_\Omega \|G(x) - \nabla U(x)\|^2 \frac{\mu_k(x)}{p_\Omega(x)} p_\Omega(x) \leq C\epsilon$$

and hence Theorem 1 can be applied to obtain an $\epsilon$-approximation of the target Gibbs distribution in terms of total variation distance.

Theorem 2. Under Assumptions A, B, C and D:
1. In S-PLMC Eq. 4, let $$\eta = \tilde{\Theta}(\min(R^2/K, \alpha/K^2)) \text{ where } \alpha = 1/(\delta + \beta^2 R^2).$$

For $K = \tilde{\Omega}(\varepsilon^{-12}d^{12})$, we have: $TV(\mu_K^{S-PLMC}, \pi) \leq \varepsilon$.

2. In S-ProxLMC Eq. 5, let $\eta = \min\left(\gamma(1+\beta^2\gamma^2)^{-1}, \frac{1}{\delta K^2}\right)$.

For $K = \tilde{\Omega}(\varepsilon^{-6}d^5)$, we have: $TV(\mu_K^{S-ProxLMC}, \pi) \leq \varepsilon$.

A proof of Theorem 2 is provided below. Note that this does not necessarily improve in terms of the convergence rate, but that black-box sampling with a good surrogate gradient has guarantees that are on par with the white-box setting.

Multiple-Constraint Satisfaction as Sampling from a Gibbs Distribution

An exemplary application of surrogate Langevin sampling is in black-box constraint satisfaction problems. The goal is to find candidates x satisfying a series of equality and inequality constraints: $\psi_j(x)=y_k$, $j=1 \ldots C_e$, and $\phi_k(x) \leq b_k$, $k=1 \ldots C_i$ where $x \in \Omega$ and $\Omega \subset \mathbb{R}^d$ is a bounded domain. A significant challenge is that the functions $\psi_j$ and $\phi_k$ can be only evaluated point-wise, and neither do we have functional forms nor access to their gradients. For example, $\psi$ and $\phi$ might be obtained via aggregating some statistics on the solution of a nonlinear PDE given by a complex solver (e.g. in nano-material design).

Cast this problem as finding a distribution under constraints via the following relaxed objective:

$$\min_{q, \int_\Omega q(x)=1} \mathcal{L}(q) \text{ where} \quad (9)$$

$$\mathcal{L}(q) = KL(q, p) + \sum_{j=1}^{C_e} \lambda_j \mathbb{E}_{x \sim q}(\psi_j(x) - y_k)^2 + \sum_{k=1}^{C_i} \lambda_k \mathbb{E}_{x \sim q}(\phi_k(x) - b_k)_+.$$

Prior p whose analytical form is known. The formulation in Eq. 9 is similar in spirit to the posterior regularization framework. However, consider two differences: (i) focus on constrained settings (where $\Omega$ is bounded), and (ii) assume a black-box setting. First obtain:

Lemma 1. The solution to the distribution learning problem given in Eq. 9 is given by:

$$\pi(x) = \frac{\exp(-U(x))}{Z} \mathbf{1}_{x \in \Omega}, \text{ where } Z = \int_{x \in \Omega} \exp(-U(x))dx, \quad (10)$$

and $U(x) = -\log p(x) + \sum_{j=1}^{C_e} \lambda_j (U_j(x) - y_k)^2 + \sum_{k=1}^{C_i} \lambda_k(\phi_k(x) - b_k)_+$.

Lemma 1 shows that the constraint satisfaction problem formulated in Eq. 9 amounts to sampling from a Gibbs distribution defined on a compact support given in Eq. 10.

Experiments

Figure 3C:
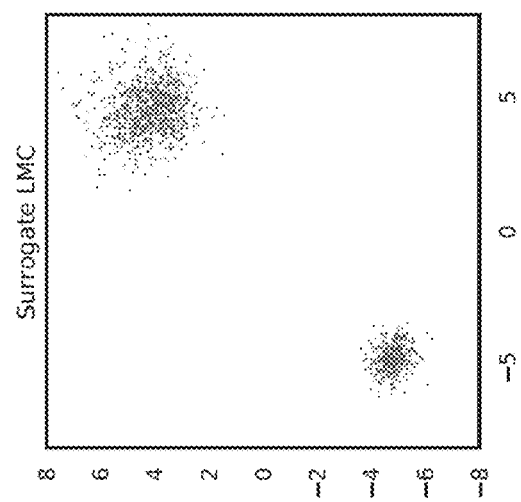
FIGS. 3A, 3B, and 3C depict exemplary samples from mixtures of Gaussians according to embodiments of the present invention.
Figure 3B:
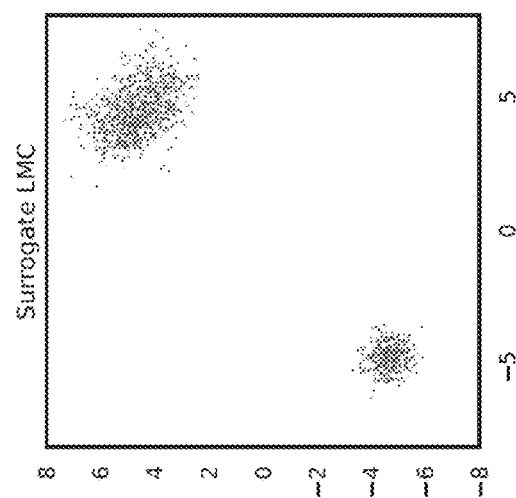
Figure 3A:
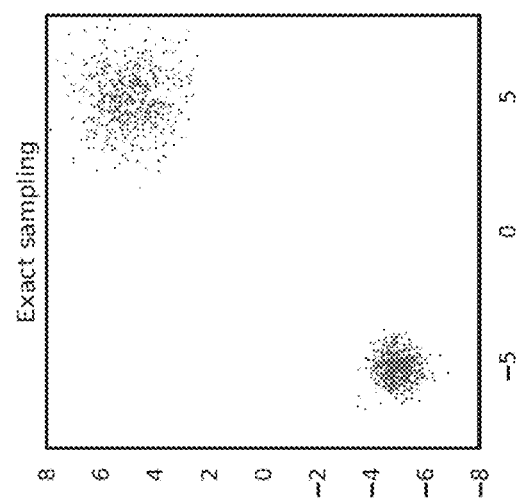

Consider the effectiveness of a black-box sampling approach according to one or more embodiments, on two synthetic examples and in a practical task of designing optimal nano-porous configurations. Refer to FIGS. 3A, 3B, and 3C, which depict samples from the mixture of Gaussians using different methods: FIG. 3A shows exact sampling; S-LMC using the gradient learned by a network on the Taylor-Reg objective in Eq. 8 with $\lambda=0$. FIG. 3B shows results for $\lambda=0$ and FIG. 3C shows results for $\lambda=10$ and $\sigma=1$.

Sampling from Mixture of Gaussians

Consider an example which shows the validity of one or more embodiments on sampling from a black-box mixture of Gaussians. To this end, consider sampling from a mixture of Gaussians in 2-D where:

$$\pi(x) \propto \exp\left(-\frac{\|x-\mu\|^2}{2}\right) + \exp\left(-\frac{\|x-\mu\|^2}{8}\right) \triangleq \exp(-U(x))$$

and $\mu=(5, 5)$. It is desired to draw samples from $\pi$ when the analytic form of U(x) is not given. Instead, U(x) can be evaluated point-wise for each x. To perform (unconstrained) surrogate Langevin sampling, uniformly sample 10K $x_i \in [-10, 10]^2$ and generate $y_i=U(x_i)$ for each i. The surrogate model is a neural network with two hidden layers of the same size and the softplus activation. Train this network with the Taylor-Reg objective Eq. 8 without regularization (i.e., $\lambda=0$) and with regularization ($\lambda=10$ and the kernel width $\sigma=1$). The experiments used an Adam optimizer with learning rate 1e-3 and exponential decay 0.8 in both cases; the network was trained with the Taylor-1 objective with the same hyper-parameters, and note that it did not learn the gradient well in the low-density regions between the two means. The resulting samples by S-LMC are shown in FIGS. 3A-3C, in comparison to the exact sampling. An approach according to one or more embodiments is shown to recover the distribution.

In another experiment, refer to S-LMC as x-PLMC or x-ProxLMC where x is one of four surrogate variants, including ({Z-Hermite, Taylor-2, Taylor-1, Taylor-Reg}).

Optimizing a Synthetic Function

One or more embodiments use the Goldstein-Price function, defined in Eq. 11, for this synthetic experiment. This function is a standard benchmark for numerical optimization problems and has been widely used in baselining the performance of BO. For $x \in [-2, 2]^2$, f(x) is given by:

$a=19-14x_1-3x_1^2-14x_2+6x_1x_2+3x_2^2$, $b=18-32x_1-12x_1^2+48x_2-36x_1x_2+27x_2^2$, $f((1+a \cdot (x_1+x_2+1)^2)(30+b \cdot (2x_1-3x_2)^2)$ (11)

The task is to find the global minimum of f(x) that is 3.0 attained at $x=(0,-1)$, using BO and an exemplary embodiment. The experiments used the off-the-shelf BOTorch library to perform BO. For a fair comparison, the experiments started both BO and a method according to one or more embodiments with the same ten random guesses (by fixing random seed in the program) and report the best function value achieved by each method. Implementation details are provided below; the results are seen in the table of FIG. 4. Note that due to the box constraint, both BO and an approach according to one or more embodiments involve a projection step; hence, only the projected Langevin methods are reported here. It can be seen that zero-order and surrogate sampling techniques according to one or more embodiments achieve lower value than BO when searching the global minimum (except for Taylor-1-PLMC), with significantly smaller runtime. The runtime difference between the Zero-order-PLMC and Exact-PLMC comes from the fact that estimating the gradient using Gaussian smoothing is faster than using auto-differentiation. Finally, Taylor-1-PLMC is less effective than the other methods, as the Taylor expansion objective (Eq. 7) does not fit the function well. The table of FIG. 4 thus shows results of BO and one or more embodiments applied to find the global minimum of the Goldstein-Price function in Eq. 11. Exact-PLMC is Langevin with the exact gradient of f(x). "Check" and "x" signs indicate whether the corresponding method uses the gradient of f(x) or training data.

Application to Nano-Configuration Design

Next, the usability of black-box Constrained Langevin sampling according to one or more embodiments in nano-configuration design under multiple constraints will be demonstrated. The typical goal is to develop new material configurations (see FIGS. 5A, 5B, and 5C) that enjoy high thermoelectric efficiency. However, while achieving the minimal thermal conductivity can be fulfilled without much difficulty (e.g. structures with all pores aligned along the vertical axis), such structures are often mechanically unstable and hard to fabricate. To design better nano-configurations, take into account both thermal conductivity and mechanical stability. These physical constraints are respectively specified by thermal conductivity $\kappa(x)$ and mechanical von Mises stress $\sigma(x)$, and they can be obtained by solving the PDEs (Boltzmann Transport Equation and the continuum linear elasticity Equation respectively). Specialized numerical PDE solvers were used for each configuration x. Other measures of mechanical stability can include, for example, not exceeding a one-time maximum stress (e.g. yield stress); not exceeding a fatigue life (S-N curve where S is stress and N number of cycles—can be done probabilistically for random stress cycling and Miner's rule can be used for cycling at different stress levels); not exceeding a buckling load in compression; and the like.

More concretely, we aim at producing a series of samples x that minimize $\kappa(x)$ to achieve high thermoelectric efficiency while maintaining $\sigma(x)$ lower than some threshold (see below). Based on the posterior regularization formulation, pose the constraint satisfaction as sampling from the following Gibbs distribution:

$$\pi(x) = p(x) \frac{\exp(-\lambda_1 \kappa(x)^2 - \lambda_2 [\sigma(x) - \tau]_+)}{Z} \mathbf{1}_{x \in [0,1]^{20}} \quad (11A)$$

In the above, p(x) is the uniform distribution over the unit square, which is equivalent to the Poisson process of 10 pores on the square, and $\tau$ is a threshold on the maximum value of $\sigma$. With this framework, relax the inequality constraint to the Hinge loss term on von Mises stress. The quantity T can be chosen by the material designer to reflects the desired constraint, such as not exceeding the material yield stress within a certain margin of safety, not exceeding the safe fatigue stress for a given number of fatigue cycles, and the like.

Sampling from the above Gibbs distribution is challenging as neither the potential function $\lambda_1 \kappa(x)^2 + \lambda_2 [\sigma(x) - \tau]_+$, nor is its gradient known. One or more embodiments employ a black-box sampling approach to remedy this. A pertinent task is to have good surrogates for the gradient of E(x).

FIGS. 5A-5C show an example of nano-porous structures with corresponding heat flux shown using a gray scale gradient. Bright regions indicate high phonons flux. The thermal conductivity $\kappa$ and von Mises stress $\sigma$ are reported below each structure. The arrows show the moving directions of the pores from their positions on the first structure (FIG. 5A). FIG. 5A is random sample. FIG. 5B shows the sample obtained by Taylor-Reg PLMC starting from FIG. 5A with $\kappa$ constraint. FIG. 5C shows the sample obtained by Taylor-Reg PLMC with both $\kappa$ and $\sigma$ constraints.

Consider pertinent data shown in the table of FIG. 6. It is desired to learn surrogate models to approximate the potential gradient from data generated from some prior distribution. To this end, create a dataset of 50K random nano-porous structures, each of size 100 nm×100 nm. A few examples are displayed in FIGS. 5A-5C. The number of pores is fixed to 10 in this study and each pore is a square with a side length of 17.32 nm. The pore centers were sampled uniformly over the unit square and the corresponding structure was constructed after re-scaling them appropriately. Then, using the solvers OpenBTE and Summit, obtain for each structure x a pair of values: thermal conductivity $\kappa$ and von Mises stress $\sigma$. Finally, collect two datasets: $\{(x_i, \kappa_i)\}_{i=1}^{N}$ and $\{(x_i, \sigma_i)\}_{i=1}^{N}$ sharing the same $x_i$ inputs, each of N=50K samples. Since source code of the solvers are available online, the data generation is straightforward. The table of FIG. 6 thus provides a result summary over twenty new samples obtained by sampling methods, according to aspects of the invention, on $\pi(x)$ with $\kappa$ and $\sigma$ constraints as per Eq. 11A, the BO baseline. The starting samples are reused from the single constraint case (min $\kappa$=0:0759, mean $\kappa$=0:1268, and mean $\sigma$=0:8181.)

Features. The pore locations are the natural input features to the surrogate models. Apart from the coordinates, derive other features based on physical intuitions. For example, the distances between pores and the alignment along axes are informative of thermal conductivity. As such, compute pore-pore distances along each coordinate axis and add them as additional features.

Surrogate gradient methods. One or more embodiments use feed-forward neural networks to model the surrogate gradients, since obtaining their gradients is efficient, thanks to automatic differentiation. One or more embodiments use networks including four hidden layers with sizes 128, 72, 64, 32 and apply the same architecture to approximate the gradients for $\kappa$ and $\sigma$ separately. The hidden layers use ReLU activations whereas sigmoid is used at the output layer (after the target output is properly normalized). For the Taylor-2 variant (in Eq. 6), there is an additional output vector of the same size as the input for the gradient prediction. The networks are trained using an Adam optimizer with learning rate $10^{-4}$ and decay 1.0. The networks are fine-tuned with simple grid-search and the best models selected for comparison. The results are presented below.

Bayesian optimization as baseline. One or more embodiments use the BOTorch library. The function it is desired to optimize is slightly different from the above potential E(x):

$$g(x) = -\lambda_1 \kappa(x)^2 - \lambda_2 \cdot [\sigma(x) - \tau]_+, \text{s.t.} \ x \in [0,1]^{20}$$

One or more embodiments optimize g(x) with BOTorch using QExpected Improvement (qEI) as the acquisition function. Initialize using the same 20 random samples used by the Langevin sampling approach and return 20 new candidates each round. For optimizing the acquisition function, the number of restarts is 20 with 200 raw samples. The number of Monte Carlo samples to estimate the qEI function is 2000. BO was run with 10 steps and the best result reported.

Comparison metrics. Starting from 20 samples initialized from p(x), run the proposed black-box Langevin MCs and BO to obtain 20 new realizations from the target distribution $\pi(x)$. To compare sampling outcomes, the minimum value of $\kappa$ and the corresponding $\sigma$ are reported. Also reported is the minimum achieved $\kappa$ when its corresponding $\alpha$ is below $\tau$.

Finally, the samples generated by different surrogate Langevin sampling methods are qualitatively compared.

The results are summarized in the table of FIG. 6. Note that all the surrogate Langevin MCs are initialized from the same set of 20 samples as above. In this experiment, set $\tau=0.5$, $\lambda_1=100$, $\lambda_2=1$ the step size $\eta=1e-3$ and the exponential decay rate 0.8. The results suggest that one or more embodiments can effectively sample new configurations under multiple competing constraints at a significantly low computational cost. Taylor-Reg-ProxLMC achieves the best performance while offering 15× speedup over Zero-order PLMC. Compared with BO, one or more embodiments achieve higher thermoelectric efficiency. The running time of BO includes data generation and surrogate fitting; however, one or more embodiments only require to fit the surrogate once for each threshold T and hence has higher reusability. Additional examples of new nano-configurations are discussed below.

One or more embodiments provide Surrogate-based Constrained Langevin dynamics for black-box sampling from a Gibbs distribution. One or more embodiments provide two approaches for approximating surrogate gradients, using (i) zero-order methods and (ii) neural network-based surrogate models. Both approaches converge to the target distribution in the log-concave and smooth case. One or more embodiments are usable in sampling from a mixture of Gaussians and in optimizing a synthetic function. A black-box sampling scheme according to aspects of the invention can be applied to nano-material configuration design, where black-box constraints are given by computationally expensive PDE solvers.

One or more embodiments are efficient in finding optimal configurations over Bayesian Optimization; learning surrogate models offers a better trade-off between computation and efficiency than the zero-order methods. Finally, Taylor-Reg-ProxLMC is a viable option that achieves the best performance while offering 15× speedup over Zero-order PLMC.

Black-box sampling according to one or more embodiments enables faster discoveries in inverse design problems such as the one in material design when one has access to black box constraints. This is useful in material design as well as design of therapeutic pharmaceuticals and the like.

Additional Experimental Results

Synthetic Experiment

Implementation details of surrogate models. One or more embodiments use neural networks to model a surrogate for the ground-truth f(x) in Eq. 11. The network includes three hidden layers of the sizes 512, 512, and 128 respectively. To train the surrogate network, generate 10K training samples and take an additional 2K samples for validation. One or more embodiments apply some data processing before training. Specifically, first take log of f(x) and normalize such that the final target values are in [0, 1]. The network's output layer computes the sigmoid function. Train the network with three variants of the training objectives: Taylor-1 (Eq. 7), Taylor-Reg (Eq. 8) and Z-Hermite (Eq. 15). The network is trained with a default Adam optimizer for 30 epochs. For Taylor-1, use learning rate 0.01 without decay. Taylor-Reg is trained with learning rate 0.005 and decay 0.7, and Z-Hermite with learning rate 0.01 with decay 0.7.

Langevin MC step. Armed with the learned surrogates, use a projected Langevin method according to one or more embodiments to find the optimum off. Run the projected Langevin dynamics with step sizer $\eta=10^{-5}$ for 1000 steps. For BO, use the same model and parameter setup as was used for the material design application, except that the number of candidates is 10 at each round and run BO was run for 1000 steps. Given the teachings herein, the skilled artisan can write computer code to optimize a pertinent function.

Nano-Porous Design

Surrogate gradient methods. One or more embodiments use feed-forward neural networks to model the surrogates because obtaining gradients for such networks is efficient thanks to automatic differentiation frameworks. One or more embodiments use networks including four hidden layers with sizes 128, 72, 64, 32 and apply the same architecture to approximate the gradients for κ and σ separately. The hidden layers compute ReLU activation whereas sigmoid was used at the output layer (after the target output is properly normalized). For the Taylor-2 variant (in Eq. 6), there is an output vector for the gradient prediction. The networks are trained on the corresponding objective functions set up earlier by an Adam optimizer with learning rate $10^{-4}$ and decay 1.0. The networks are fine-tuned with simple grid-search and the best models are selected for comparison.

Figure 7A:
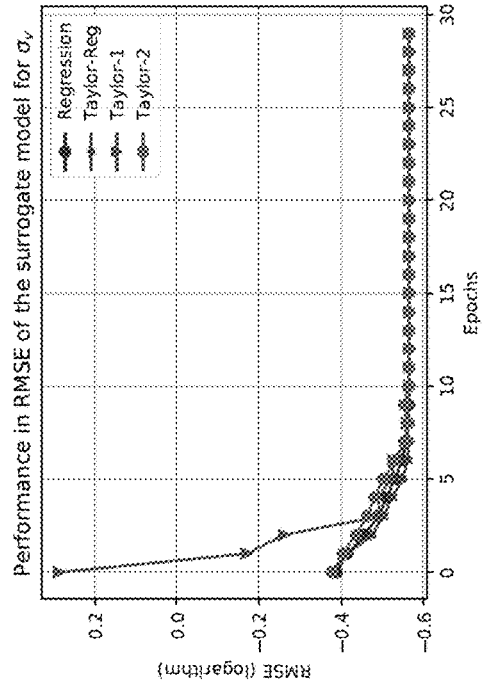
FIGS. 7A, 7B, 8A, and 8B compare surrogate variants and surrogate models according to embodiments of the present invention.
Figure 7B:
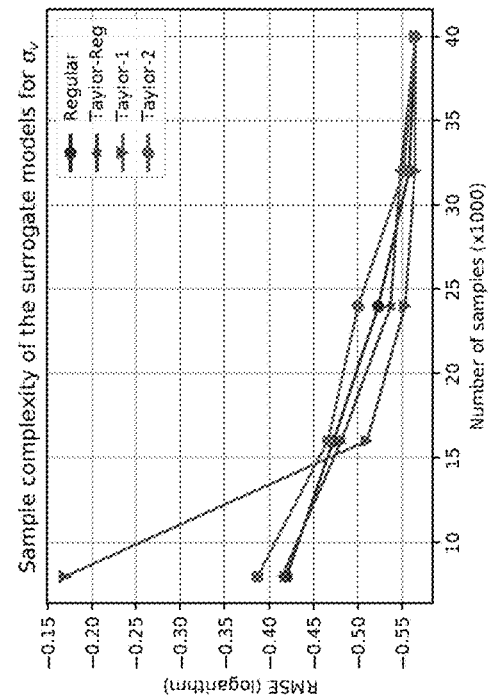
Figure 8A:
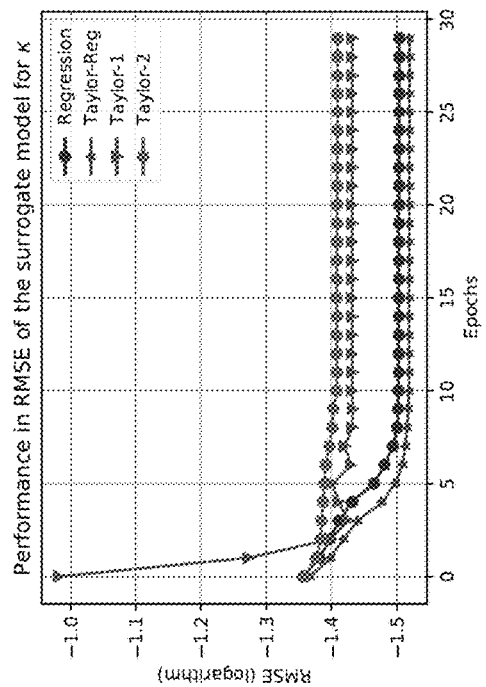
Figure 8B:
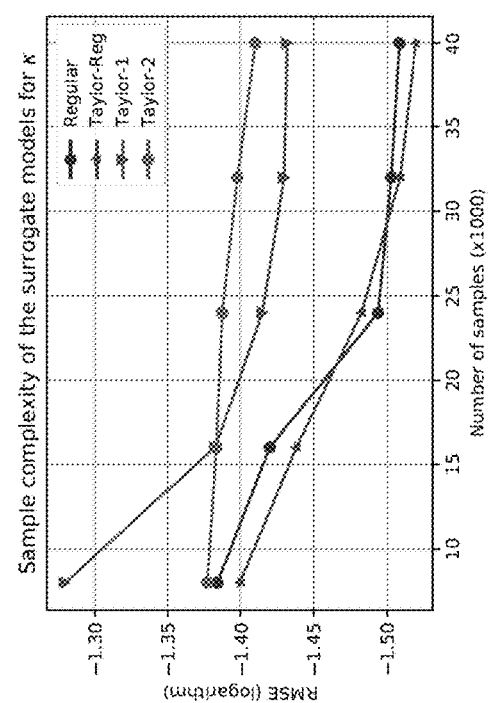

One or more embodiments focus on approximating the gradient rather than learning the true function. It is appropriate in one or more embodiments to evaluate the surrogate models on how well they generalize on a hold-out test set. Like canonical regression problems, the surrogate variants are compared against each other using root mean square error (RMSE) on the test set. FIGS. 7A, 7B, 8A, and 8B shows the results. FIG. 7A shows RMSE for predicting κ and FIG. 7B shows RMSE for the von Mises stress σ. It can see be seen that the Taylor-Reg generalizes better and also converges faster than Taylor-1 and Taylor-2 to the target RMSE for κ, while all methods result similarly for σ prediction. This is reasonable because the objectives of Taylor-1 and Taylor-2 are not to optimize the mean square error, which are evaluated on here. FIGS. 8A and 8B show the learning in terms of sample complexity; FIG. 8A is for predicting κ and FIG. 8B for predicting σ. Again, Taylor-Reg outperforms Taylor-1 and Taylor-2 for κ prediction. In contrast, most models work similarly for σ regression, particularly when the training size is reduced to 50% (25K).

Furthermore regarding FIGS. 7A and 7B, the same present a comparison of the surrogate variants in testing RMSE. FIG. 7A is a prediction accuracy for the thermal conductivity κ. FIG. 7B shows prediction accuracy for mechanical stability σ. Note the difference in scale of κ and σ. Furthermore regarding FIGS. 8A and 8B, the same present a comparison of the surrogate models in RMSE on the same test set when the training size is varied. Note the scale difference in the figures due to the different range of values.

Figure 9A:
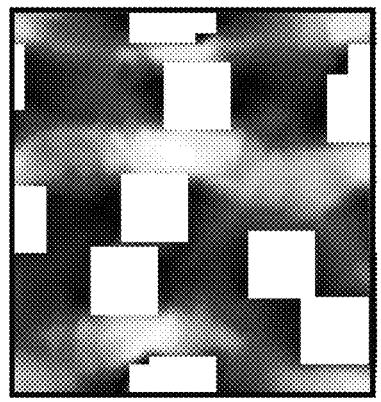
FIGS. 9A, 9B, 9C, 10A, 10B, and 10C depict exemplary results for nano-porous structures according to embodiments of the present invention.
Figure 9B:
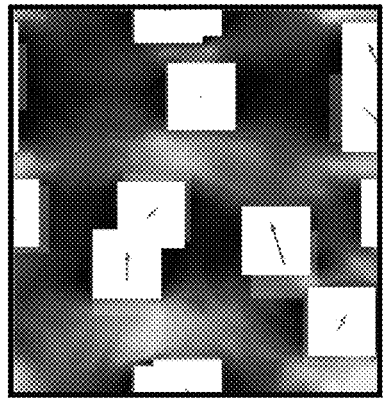
Figure 9C:
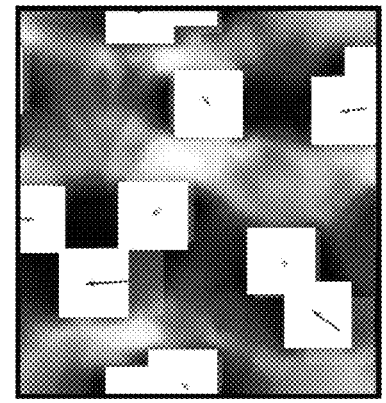
Figure 10A:
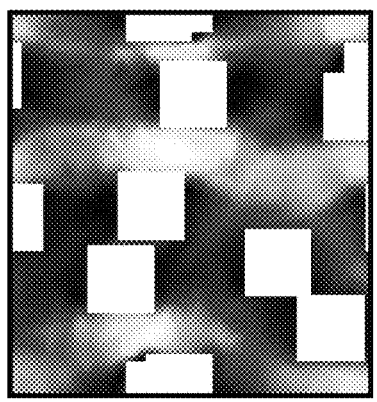
Figure 10B:
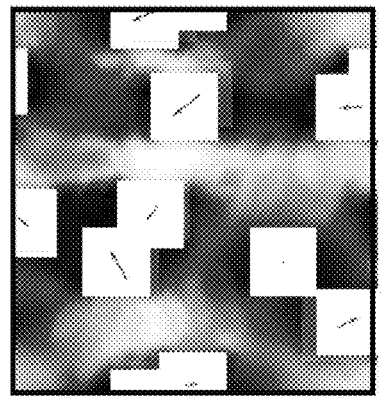
Figure 10C:
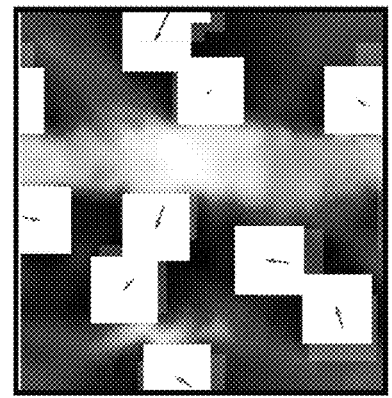

Additional generated samples. Additional configurations generated by an exemplary inventive sampling approach (Taylor-Reg ProxLMC, Taylor-1 ProxLMC and Zero-order ProxLMC) are shown in FIGS. 9A, 9B, 9C and 10A, 10B, 10C. FIGS. 9A-9C show examples of nano-porous structures with corresponding heat flux shown using a grey scale gradient. Bright regions indicate high phonons flux. The thermal conductivity κ and von Mises stress σ are reported below each structure. The arrows show the moving directions of the pores. FIG. 9A shows a random sample. FIG. 9B shows the sample obtained by Taylor-Reg ProxLMC starting from FIG. 9A with κ constraint. FIG. 9C shows the sample obtained by Taylor-Reg ProxLMC with both κ and σ constraints. FIGS. 10A-10C show examples of nano-porous structures with corresponding heat flux shown using a grey scale gradient. Bright regions indicate high phonons flux. The thermal conductivity thermal conductivity κ and von Mises stress σ are reported below each structure. The arrows show the moving directions of the pores. FIG. 10A shows a random sample. FIG. 10B shows the sample obtained by Taylor-1 ProxLMC starting from FIG. 10A with κ constraint. FIG. 10C shows the sample obtained by Taylor-1 ProxLMC with both κ and α constraints.

Zero-Order Constrained Langevin MC

Zero-order optimization considers the Gaussian smoothed potential $U_\nu$ defined as $U_\nu(x)=\mathbb{E}_{g \sim \mathcal{N}(0, I_d)} U(x+\nu g)$, and its gradient given by $$\nabla_x U_\nu(x) = \mathbb{E}_g \frac{U(x+\nu g) - U(x)}{\nu} g.$$

The following is a Monte Carlo estimate of $\nabla_x U_\nu(x)$:

$$\hat{G}_n U(x) = \frac{1}{n}\sum_{j=1}^n \left(\frac{U(x+\nu g_j) - U(x)}{\nu}\right) g_j \quad (12)$$

In the above, $g_1, \ldots g_n$ are i.i.d. (independent, identically distributed) standard normal vectors.

Zero-Order sampling from log-concave densities is extended in one or more embodiments to the constrained sampling case of log-concave densities with compact support. Define Constrained Zero-Order Projected LMC (Z-PLMC) and Zero-Order Proximal LMC (Z-ProxLMC) by setting $G(x)=\widehat{G_n} U(x)$ in Eq. 4 and Eq. 5 respectively.

Lemma 2 (Zero-Order Gradient Approximation). Under Assumption B, for all $x \in \Omega$:

$$\mathbb{E}_{g_1 \ldots g_n} \|\hat{G}_n U(x) - \nabla_x U(x)\|^2 \leq \frac{(\beta v(d+2)^{3/2} + (d+1)^{1/2} L)^2}{n}$$

Thanks to Lemma 2, which ensures uniform approximation of gradients in expectation, it is possible to apply Theorem 2 and obtain the following corollary for Z-PLMC and Z-ProxLMC:

Corollary 1 (Zero-order Constrained Langevin approximates the Gibbs distribution). Under Assumptions A and B, let $\delta \in [0, 1]$, for $n \geq (\beta v(d+2)^{3/2}+(d+1)^{1/2}L)^2/\delta$, have the following bounds in expectation:

1. Set $\lambda = 1$, and $\eta = \Theta(\min(R^2/K, \alpha/K^2))$ where $\alpha = 1/(\delta + \beta^2 R^2)$. For $K = \tilde{\Omega}(\varepsilon^{-12} d^{12})$, we have: (13)

$$\mathbb{E}_{g_1,\ldots g_n} TV(\mu_K^{Z\text{-PLMC}}, \pi) \leq \varepsilon.$$

2. Set $\lambda = 1$, and $\eta = \min\left(\gamma(1+\beta^2\gamma^2)^{-1}, \frac{1}{\delta K^2}\right)$. (14)

For $K = \tilde{\Omega}(\varepsilon^{-6} d^5)$ we have: $\mathbb{E}_{g_1,\ldots g_n} TV(\mu_K^{Z\text{-ProxLMC}}, \pi) \leq \varepsilon$.

Zero-Order Hermite Learning of Gradients

Despite its theoretical guarantees, zero-order constrained Langevin (Z-PLMC and Z-ProxLMC) has a prohibitive computation cost as it needs O(nK) black-box queries (e.g. invocations of a nonlinear PDE solver). To alleviate this issue, one or more embodiments employ a neural surrogate model as an alternative to the gradient of the true potential.

From Theorem 2, it can be seen that in order to guarantee the convergence of constrained Langevin dynamics, a good estimate of the gradient of the potential of the Gibbs distribution should be obtained. Recall that the potential given in Lemma 1 depends on $U_j$ and $\varphi_k$, which are scalar outputs of computationally heavy PDE solvers in the exemplary material design problem. To avoid this, one or more embodiments train surrogate neural network models to learn the potential: U(x):

$$S=\{(x_i, y_i=U(x_i), \tilde{y}_i=\hat{G}_n U(x_i)), x_i \sim p_\Omega \text{ i.i.d.}, i=1, \ldots N\}$$

In the above, $p_\Omega$ is the training distribution and $\widehat{G_n} U(.)$ is the zero-order estimate of the gradient of U given in Eq. 12 or any adjoint methods. One or more embodiments learn a surrogate model belonging to a function class $\mathcal{H}_\theta$, $\hat{f}_\theta \in \mathcal{H}_\theta$, that regresses the value of U and matches the zero-order gradient estimates as follows (Z-Hermite Learning):

$$\min_{f_\theta \in \mathcal{H}_\theta} \frac{1}{N}\sum_{i=1}^N \{(y_i - f_\theta(x_i))^2 + \|\nabla_x f_\theta(x_i) - \tilde{y}_i\|^2\} \quad (15)$$

As will be appreciated by the skilled artisan, the problem in Eq. 15 has been introduced and analyzed in the literature in a context where $\mathcal{H}_\theta$ is a ball in a Reproducing Kernel Hilbert Space (RKHS). This type of learning is referred to herein as Hermite Learning. In the deep learning community, this type of learning is called Jacobian matching and has been introduced in the literature where $\mathcal{H}_\theta$ is a deep neural network parameterized with weights θ. When $f_\theta$ is a deep network, this objective can be efficiently optimized using deep learning frameworks such as PyTorch and/or TensorFlow.

It has been shown in the literature that when $\mathcal{H}_\theta$ is an RKHS ball and when $\tilde{y}_i = \nabla_x U(x_i)$ are exact gradients, for a sufficiently large training set with $N=O(1/\epsilon^{1/(2r\zeta)})$ (where r, ζ are exponents in [0, 1] that depend on the regularity of the function U). Under the assumption that $U \in \mathcal{H}_\theta$ have: $\int_\Omega \|\nabla_x f_\theta(x) - \nabla_x U(x)\|^2 p_\Omega(x) dx \leq \epsilon$. Since inexact zero-order gradients are used, an additional bounded numerical error is incurred (see Lemma 2).

Background on Stochastic Differential Equations (SDE): Change of Measure and Girsanov's Formula Theorem 3 (Girsanov Theorem, Change of Measure for Brownian Motion). Let $(W_t, \mathcal{F}_t)$ be a Wiener process (Brownian motion) and $(\beta_t, \mathcal{F}_t)$ a random process such that for any T>0:

$\int_0^T \|\beta_t\|^2 dt < \infty \ a.s$

Then the random process: $d\tilde{W}_t = dW_t - \beta_t dt$ or written equivalently: $\tilde{W}_t = W_t - \int_0^t \beta_s ds$, is a Wiener process with respect to $\mathcal{F}_t$, $t \in [0,T]$ Let $P_T^W = \mathcal{L}(W_{[0,T]})$, and $P_T^{\tilde{W}} = \mathcal{L}(\tilde{W}_{[0,T]})$ the densities are given by:

$$\frac{dP_T^{\tilde{W}}}{dP_T^W} = \exp\left(\int_0^T \langle \beta_s, dW_s \rangle - \frac{1}{2}\int_0^T \|\beta_s\|^2 ds\right).$$

It follows that:

$$KL(P_T^W, P_T^{\tilde{W}}) = \frac{1}{2} \mathbb{E}_{P_T^W}[\int_0^T \|\beta_s\|^2 ds] \quad (16)$$

Theorem 4 (Girsanov Theorem, Change of Measure for Diffusion Processes). Let $(X_t)_{t \geq 0}$ and $(Y_t)_{t \geq 0}$ $dX_t = \alpha_t(X) dt + dW_t$ $dY_t = \beta_t(Y) dt + dW_t$ In the above, $X_0=Y_0$ is an $\mathcal{F}_0$ measurable random variable. Suppose that the non-anticipative functionals $\alpha_t(x)$ and $\beta_t(x)$ are such that unique continuous strong solutions exist for both processes. If for any T>0:

$$\int_0^T \|\alpha_s(X)\|^2 + \|\beta_s(X)\|^2 ds < \quad (17)$$

$\infty(a, s)$ and $\int_0^T \|\alpha_s(Y)\|^2 + \|\beta_s(Y)\|^2 ds < \infty(a \cdot s)$.

Let $P_T^X = \mathcal{L}(X_{[0,T]})$, and $P_T^Y = \mathcal{L}(Y_{[0,T]})$.

$$\frac{dP_T^Y}{dP_T^X}(X) =$$

$$\exp\left(-\int_0^T \langle\alpha_s(X) - \beta_s(X), dX_s\rangle + \frac{1}{2}\int_0^T (\|\alpha_s(X)\| - \|\beta_s(X)\|^2)ds\right).$$

$$KL(P_T^X, P_T^Y) = \frac{1}{2}\mathbb{E}_{P_T^X}\left[\int_0^T \|\alpha_s(X) - \beta_s(X)\|^2 ds\right].$$

Background on Zero-Order Optimization (Gradient-Free)
Consider the smoothed potential $U_v$ defined as follows:

$$U_v(x) = \mathbb{E}_{g \sim \mathcal{N}_{(0, I_d)}} U(x+vg)$$

Its gradient is given by:

$$\nabla_x U_v(x) = \mathbb{E}_g \frac{U(x+vg) - U(x)}{v} g,$$

A Monte Carlo estimate of $\nabla_x U_v(x)$ is:

$$\hat{G}_n(x) = \frac{1}{n}\sum_{j=1}^n \left(\frac{U(x+vg_j) - U(x)}{v}\right) g_j,$$

where $g_1, \ldots, g_n$ are i.i.d. standard Gaussians vectors.

Using known results in zero order optimization under assumptions on smoothness and bounded gradients of the gradients obtain for all x:

$$\mathbb{E}_g \|\hat{G}_1(x) - \nabla_x U(x)\|^2 \leq$$

$$(\beta v(d+2)^{3/2} + (d+1)^{1/2}\|\nabla_x U(x)\|)^2 \leq (\beta v(d+2)^{3/2} + (d+1)^{1/2}L)^2$$

Finally, by independence of $u_1, \ldots, u_n$ obtain:

$$\mathbb{E}_{g_1, \ldots, g_n} \|\hat{G}_n(x) - \nabla_x U(x)\|^2 \leq \frac{(\beta v(d+2)^{3/2} + (d+1)^{1/2}L)^2}{n} \quad (18)$$

Proofs
Proof of Lemma 1. Define the Lagrangian:

$$L(q, \eta) = \int_\Omega \log\left(\frac{q(x)}{p_0(x)}\right) q(x)dx + \sum_{j=1}^{C_e} \lambda_j \int_\Omega (U_j(x) - y_j)^2 q(x)dx +$$

$$\sum_{k=1}^{C_i} \lambda_k \int_{x \in \Omega} (\phi_k(x) - b_k)_+ q(x)dx + \eta\left(1 - \int_{x \in \Omega} q(x)\right)$$

Setting first order optimality conditions on q, for $x \in \Omega$:

$$\log\left(\frac{q(x)}{p_0(x)}\right) + 1 + \sum_{j=1}^C \lambda_j(U_j(x) - y_j)^2 + \sum_{k=1}^{C_i} \lambda_k(\phi_k(x) - b_k)_+ - \eta = 0$$

Hence obtain:

$$q(x) = p_0(x)\frac{\exp\left(-\sum_{j=1}^{C_e} \lambda_j(U_j(x) - y_j)^2 - \sum_{k=1}^{C_i} \lambda_k(\phi_k(x) - b_k)_+\right)}{e \exp - \eta},$$

$$x \in \Omega \text{ and } q(x) = 0, x \notin \Omega.$$

First order optimality on $\eta$ yields: $\int_\Omega q(x) = 1$; conclude by setting $e \exp(-\eta) = Z$.

Proof of Theorem 1 Projected Langevin. Define the following continuous processes by interpolation of $X_k$ and $Y_K$ (Piecewise constant):

$$d\tilde{X}_t = P_\Omega(\tilde{U}_t(\tilde{X})dt + \sqrt{2\lambda}dW_t)$$

where $\tilde{U}_t(\tilde{X}) = -\sum_{k=0}^\infty \nabla_x U(\tilde{X}_{k\eta}) \mathbb{1}_{t \in [k\eta, (k+1)\eta]}(t)$. Similarly let us define $$d\tilde{Y}_t = P_\Omega(G_t(\tilde{Y})dt + \sqrt{2\lambda}dW_t)$$

where $G_t(\tilde{Y}) = -\sum_{k=0}^\infty G(\tilde{Y}_{k\eta}) \mathbb{1}_{t \in [k\eta, (k+1)\eta]}(t)$.

It can be seen that: $X_k = \tilde{X}_{k\eta}$ and $Y_k = \tilde{Y}_{k\eta}$.

Let $\pi_{\tilde{X}}^T$ and $\pi_{\tilde{Y}}^T$ be the distributions of $(\tilde{X}_t)_{t \in [0,T]}$ and $(\tilde{Y}_t)_{t \in [0,T]}$.

Note that:

$$d\tilde{Y}_t = P_\Omega\left(\tilde{U}_t(\tilde{X}_t)dt + \sqrt{2\lambda}\left(dW_t + \frac{1}{\sqrt{2\lambda}}(G_t(\tilde{Y}_t) - \tilde{U}_t(\tilde{X}_t))dt\right)\right)$$

Let $$d\tilde{W}_t = dW_t + \frac{1}{\sqrt{2\lambda}}(G_t(\tilde{Y}_t) - \tilde{U}_t(\tilde{X}_t))dt$$

Hence we have:

$$d\tilde{Y}_t = P_\Omega(\tilde{U}_t(\tilde{X}) + \sqrt{2\lambda} d\tilde{W}_t),$$

Assume that $X_0 = Y_0$ there exists $Q$ such that $\tilde{X}_T = Q(\{W_t\}_{t \in [0,T]})$ and $\tilde{Y}_T = Q((\tilde{W}_t)_{t \in [0,T]})$. Let $\mu_T^{\tilde{X}}$ be the law of $\tilde{X}_{t \in [0,T]}$; same for $\mu_T^{\tilde{Y}}$. The proof here is similar to the proof of Lemma 8. By the data processing inequality:

$$KL(\mu_T^{\tilde{X}}, \mu_T^{\tilde{Y}}) \leq KL(W_{t \in [0,T]}, \tilde{W}_{t \in [0,T]})$$

Now using Girsanov's Theorem for change of measure of Brownian Motion (Theorem 3) obtain:

$$KL(W_{t \in [0,T]}, \tilde{W}_{t \in [0,T]}) = \frac{1}{4\lambda}\mathbb{E}\int_0^T |G_t(\tilde{Y}_t) - \tilde{U}_t(\tilde{X}_t)|^2 dt$$

Consider $T = K\eta$; hence, have (with simplified notation, drop tilde as $Y_k = \tilde{Y}_{k\eta}$):

$$KL(\mu_T^{\tilde{X}}, \mu_T^{\tilde{Y}}) \leq \frac{1}{4\lambda}\mathbb{E}\int_0^{K\eta} |G_t(\tilde{Y}_t) - \tilde{U}_t(\tilde{X}_t)|^2 dt$$

$$= \frac{1}{4\lambda}\mathbb{E}\sum_{k=0}^{K-1} \int_{k\eta}^{(k+1)\eta} \|G(Y_{k\eta}) - \nabla_x U(X_{k\eta})\|^2 dt$$

-continued $$= \frac{\eta}{4\lambda} \sum_{k=0}^{K-1} \mathbb{E}\|G(Y_{k\eta}) - \nabla_x U(X_{k\eta})\|^2$$

$$= \frac{\eta}{4\lambda} \sum_{k=0}^{K-1} \mathbb{E}\|G(Y_{k\eta}) - \nabla_x U(Y_{k\eta}) + \nabla_x U(Y_{k\eta}) - \nabla_x U(X_{k\eta})\|^2$$

$$\leq \frac{\eta}{2\lambda} \sum_{k=0}^{K-1} \mathbb{E}\|G(Y_{k\eta}) - \nabla_x U(Y_{k\eta})\|^2 + \mathbb{E}\|\nabla_x U(Y_{k\eta}) - \nabla_x U(X_{k\eta})\|^2$$

In the last inequality, use the fact that $\|a-b\|^2 \leq 2(\|a\|^2+\|b\|^2)$. Note that by the smoothness assumption on U:

$$\|\nabla_x U(Y_{k\eta}) - \nabla_x U(X_{kh})\|^2 \leq \beta^2 \|X_{kh} - Y_{kh}\|^2$$

Let R be the diameter of $\Omega$, obtain a bound as follows:

$$KL(\mu_T^{\tilde{X}}, \mu_T^{\tilde{Y}}) \leq \frac{\eta}{2\lambda}\left(\underbrace{\sum_{k=0}^{K-1} \mathbb{E}\|G(Y_{k\eta}) - \nabla_x U(Y_{k\eta})\|^2}_{\text{Gradient approximation error}} + \beta^2 \sum_{k=0}^{K-1} \mathbb{E}\|X_{kh} - Y_{kh}\|^2\right)$$

$$\leq \frac{\eta}{2\lambda}\left(\sum_{k=0}^{K-1} \mathbb{E}\|G((Y_{k\eta}) - \nabla_x U(Y_{k\eta})\|^2 + K\beta^2 R^2\right)$$

Now, using the Pinsker inequality:

$$TV(\mu_T^{\tilde{X}}, \mu_T^{\tilde{Y}})^2 \leq 2KL(\mu_T^{\tilde{X}}, \mu_T^{\tilde{Y}}) \leq \frac{\eta}{\lambda}\left(\sum_{k=0}^{K-1} \mathbb{E}\|G(Y_{k\eta}) - \nabla_x U(Y_{k\eta})\|^2 + K\beta^2 R^2\right)$$

Hence for $T=K\eta$ obtain:

$$TV(\mu_K^{S\text{-}PLMC}, \mu_K^{PLMC}) \leq \sqrt{\frac{\eta}{\lambda}\left(\sum_{k=0}^{K-1} \mathbb{E}\|G(Y_k) - \nabla_x U(Y_k)\|^2 + K\beta^2 R^2\right)} \quad (19)$$

Proof of Theorems 1 and 2—Proximal LMC. Define the following continuous processes by interpolation of $X_k$ and $Y_K$ (Piecewise constant):

$$d\tilde{X}_t = \tilde{U}_t(\tilde{X})dt + \sqrt{2\lambda}dW_t$$

In the above:

$$\tilde{U}_t(\tilde{X}) = -\sum_{k=0}^{\infty}\left(\nabla_x U(\tilde{X}_{k\eta}) + \frac{1}{\gamma}(\tilde{X}_{k\eta} - P_\Omega(\tilde{X}_{k\eta}))\right)\mathbb{1}_{t\in[k\eta,(k+1)\eta]}(t)$$

Similarly, define:

$$d\tilde{Y}_t = G_t(\tilde{Y})dt + \sqrt{2\lambda}dW_t.$$

In the above:

$$G_t(\tilde{Y}) = -\sum_{k=0}^{\infty}\left(G(\tilde{Y}_{k\eta}) + \frac{1}{\gamma}(\tilde{Y}_{k\eta} - P_\Omega(\tilde{Y}_{k\eta}))\right)\mathbb{1}_{t\in[k\eta,(k+1)\eta]}(t)$$

Now, applying Girsanov's Theorem for diffusions (Theorem 4), obtain:

$$KL(\mu_T^{\tilde{X}}, \mu_T^{\tilde{Y}}) = \frac{1}{4\lambda}\mathbb{E}_{P_T^X}\left[\int_0^T \|\tilde{U}_t(\tilde{X}) - G_t(\tilde{X})\|^2 dt\right]$$

$$= \frac{1}{4\lambda}\mathbb{E}\sum_{k=0}^{K-1}\int_{k\eta}^{(k+1)\eta}\|G(\tilde{X}_{k\eta}) - \nabla_x U(\tilde{X}_{k\eta})\|^2 dt$$

$$= \frac{\eta}{4\lambda}\sum_{k=0}^{K-1}\mathbb{E}\|G(\tilde{X}_{k\eta}) - \nabla_x U(\tilde{X}_{k\eta})\|^2$$

$$= \frac{\eta}{4\lambda}\sum_{k=0}^{K-1}\mathbb{E}\|G(X_k) - \nabla_x U(X_k)\|^2.$$

Now, using the Pinsker inequality:

$$TV(\mu_{\tilde{X}}^T, \mu_{\tilde{Y}}^T)^2 \leq 2KL(\mu_{\tilde{X}}^T, \mu_{\tilde{Y}}^T)$$

Hence, for $T=Kg$, obtain:

$$TV(\mu_K^{S\text{-}ProxLMC}, \mu_K^{ProxLMC}) \leq \sqrt{\frac{\eta}{2\lambda}\left(\sum_{k=0}^{K-1}\mathbb{E}\|G(X_k) - \nabla_x U(X_k)\|^2\right)^{\frac{1}{2}}} \quad (20)$$

Proof of Theorem 2. S-PLMC. Set $\lambda=1$, $\eta \leq \alpha/K^2$, where $\alpha=1/(\delta+\beta^2 R^2)$. In this corollary, obtain:

$$TV(\mu_K^{S\text{-}PLMC}, \mu_K^{PLMC}) \leq \frac{1}{\sqrt{K}}.$$

Assuming A, B and C, consider $\eta \leq \min(R^2/K, \alpha/K^2)$, and $K=\Omega(\varepsilon^{-12}d^{12})$. Now using the triangle inequality together with the bounds (refer to discussion above of two different expressions for K), obtain:

$$TV(\mu_K^{S\text{-}PLMC}, \pi) \leq TV(\mu_K^{S\text{-}PLMC}, \mu_K^{PLMC}) + TV(\mu^{PLMC}, \pi) \leq \varepsilon + \frac{1}{\sqrt{K}}.$$

S-ProxLMC. Consider a similar argument for $TV(\mu_K^{S\text{-}ProxLMC}, \pi)$.

Considering $$\eta = \min\left(\gamma(1+\beta^2\gamma^2)^{-1}, \frac{1}{\delta K^2}\right), \text{ and } K = \tilde{\Omega}(\varepsilon^{-6}d^5),$$

obtain $\left(\varepsilon + \frac{1}{\sqrt{K}}\right)$ approximation in TV of the target Gibbs distribution.

Proof of Corollary 1. Z-PLMC: Consider:

$$TV(\mu_T^{\tilde{X}}, \mu_T^{\tilde{Y}}) \leq \sqrt{\frac{\eta}{\lambda}\left(\sum_{k=0}^{K-1}\mathbb{E}\|G_n U(Y_{k\eta}) - \nabla_x U(Y_{k\eta})\|^2 + K\beta^2 R^2\right)}$$

Taking the expectation we have:

$$\mathbb{E}_{g_1\cdots g_n}TV(\mu_T^{\tilde{X}}, \mu_T^{\tilde{Y}}) \leq$$

$$\mathbb{E}_{g_1\cdots g_n}\sqrt{\frac{\eta}{\lambda}\left(\sum_{k=0}^{K-1}\mathbb{E}\|G_n U(Y_{k\eta}) - \nabla_x U(Y_{k\eta})\|^2 + K\beta^2 R^2\right)} \leq$$

$$\sqrt{\frac{\eta}{\lambda}\left(\sum_{k=0}^{K-1}\mathbb{E}_Y\mathbb{E}_{g_1\ldots g_n}\|G_nU(Y_{k\eta})-\nabla_x U(Y_{k\eta})\|^2+K\beta^2R^2\right)}$$ (Jensen inequality)

Note now that we have:

$$\mathbb{E}_{g_1\ldots g_n}\|G_nU(Y_{k\eta})-\nabla_x U(Y_{k\eta})\|^2\leq\delta,\ \forall Y_{k\eta}.$$

For $n\geq(\beta v(d+2)^{3/2}+(d+1)^{1/2}L)^2/\delta$. The rest of the proof is an application of Theorem 2.

Z-ProxLMC. A similar argument holds.

One or more embodiments provide deep surrogate Langevin sampling for multi-objective constraint black box optimization with applications to optimal inverse design problems and the like. Consider, for example, the design of thermoelectric nanomaterials. The location, size, and configuration of holes will determine how electricity flows and how heat will be dissipated, the mechanical stability (resistance to breakage), and the like. The underlying problem is that it is desired to have a material that satisfies multiple physical constraints that can be modeled by partial differential equations (PDEs). The goal is to design nano-configurations that satisfy physical constraints. Numerical solvers can be used. One or more embodiments address an inverse problem where the desired values are known and it is required to work backwards to "x." Such numerical solutions are computationally complex and thus expensive. Many solvers also do not provide access to the gradients.

Refer to the discussion of the equality constraint ψ and inequality constraint φ, with bounding constraint x bounded within a box Ω. Reformulate the problem as finding a distribution q of candidates close to a prior (if a prior is known). Suppose a prior $p_0$ is known. Relax the constraint; say, equality constraint is satisfied in the mean square error (MSE) sense. Also relax the inequality constraint (max $\phi(x)-b_k$ equals zero). Formulating in this relaxed manner changes the problem from optimizing over one configuration to sampling from the optimum design q. The optimal solution has a closed form. Refer to discussions of the Boltzmann distribution or Gibbs distribution with potential U.

The normalization term Z (refer to Eq. (1)) is problematic in some instances and integration over the whole range of x bounded within a box Ω is appropriate. A sample is desired out of the solution π, as discussed elsewhere herein. One or more embodiments, analogously to gradient descent, employ Langevin dynamics. One or more embodiments take the log of the density that it is desired to sample from. Then, take the gradient of the log of the density; once the log is taken the gradient Z is a constant and so it disappears. One of the terms $\xi_k$ is Gaussian noise and thus the process becomes stochastic. Then, project back to the box. In Projected Langevin Dynamics, iterate from a configuration $x_0$ and then follow the gradient; in Proximal Langevin Dynamics, only project $x_k$.

Figure 11:
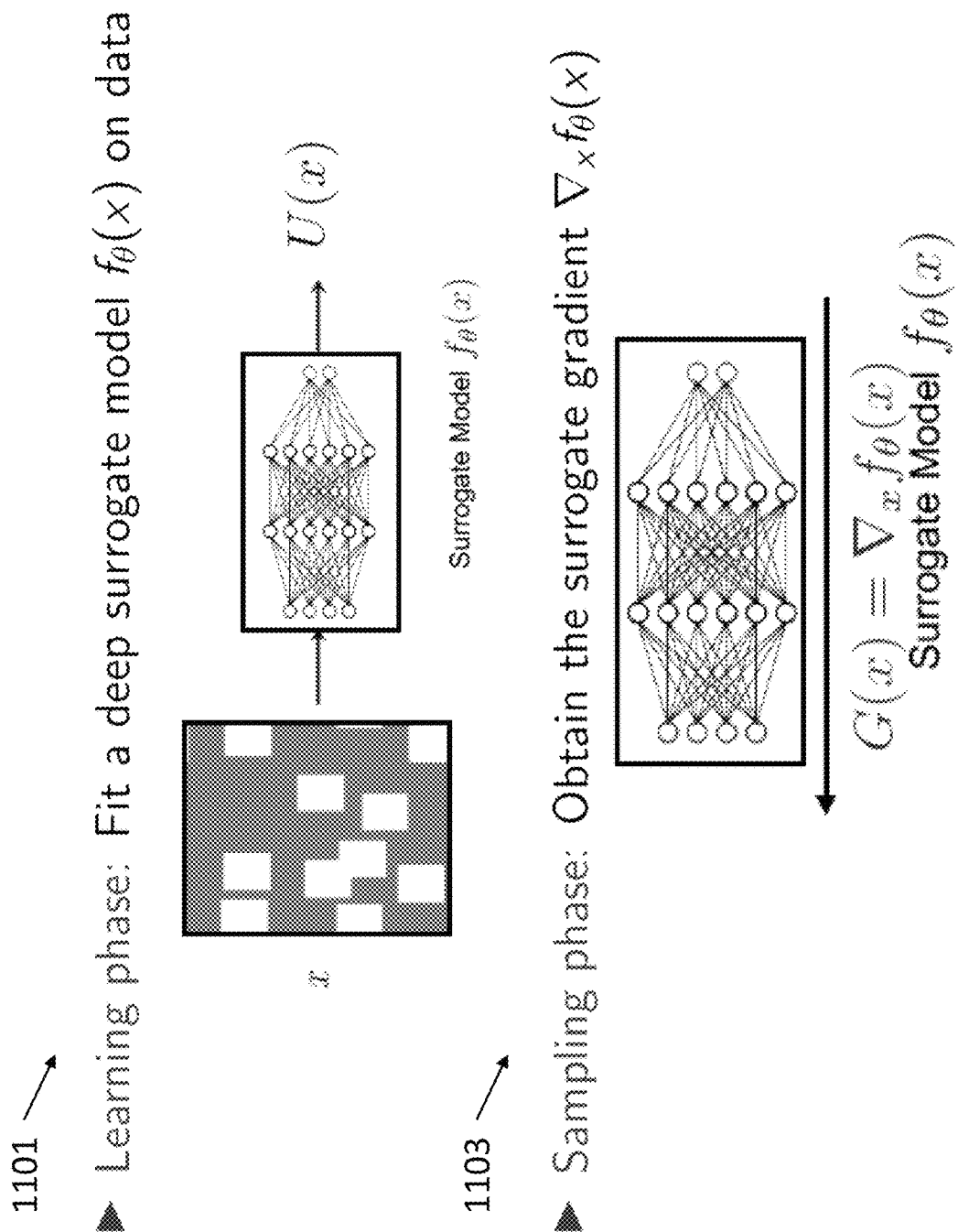
FIG. 11 shows exemplary learning and sampling phases according to embodiments of the present invention.

This is called white box sampling—when the constraint is known. When the constraints are PDEs, Black box sampling can be employed. When the gradient cannot be obtained, find a surrogate; e.g., replace ∇U with a function G. G is a "close enough" surrogate. FIG. 11 shows aspects of a learning phase 1101 and a sampling phase 1103. Aspects of the invention are directed to providing a new surrogate via machine learning. First, construct a training set with multiple inputs x and obtain the values U(x); carry this out on the order of ten thousand times for different configurations. Stated differently, collect a training set in phase 1101 and train it to predict the function U. Then, in the sampling phase 1103, instead of using Grad U (∇U), use the gradient of the neural network. Replace the PDE solver with a neural network to be trained. For sampling use the Grad (∇) of the neural network instead of the unknown constraint.

Pertinent aspects of one or more embodiments include Hermite learning and Taylor learning. Finite differences can be used but are very expensive; they involve taking the function, evaluating it, and adding noise. The gradient of a scalar-valued differentiable function at a point is the direction in which the function increases the most. Formally, it is the vector field whose vector components are partial derivatives at the point. Regarding Hermite learning, determining a gradient typically requires evaluation at many perturbations. PDE solvers are expensive. One or more embodiments use the PDE solver "once for all" to train the machine learning and then do not need to use the PDE solver again. A good surrogate predicts correctly and matches the gradient.

Regarding Taylor learning, consider how to proceed when no information is available about the gradient. Fit the values and fit a Taylor series expansion around each point $x_i$. Using Taylor series, $y_j$ can be approximated given $y_i$, $x_i$ and $x_j$ and the gradient at $x_j$. Given true values of the prediction, learn a neural network that predicts the local gradient correctly—locally consistent gradient with Taylor series expansion. $W_{ij}$ is a weight with high value if $x_i$ and $x_j$ are close and low value if $x_i$ and $x_j$ are far apart. The Taylor series is true if $x_i$ is close to $x_j$. Refer to Eqs. (6)-(8).

FIGS. 12A-12C show further examples of nano-porous structures with corresponding heat flux shown using a grey scale gradient. Bright regions indicate high phonons flux. The thermal conductivity thermal conductivity κ and von Mises stress σ are reported below each structure. The arrows show the moving directions of the pores. FIG. 12A shows a random sample. FIG. 12B shows the sample obtained by Zeroth ProxLMC starting from FIG. 11A. FIG. 11C shows the sample obtained by Zeroth ProxLMC with both κ and σ constraints.

Advantageously, one or more embodiments apply machine learning techniques to inverse design problem, such as optimal nano-configuration); accelerate scientific discoveries via deep surrogate Langevin sampling; provide a general framework for inverse design, particularly for problems with multiple black-box constraints such as the physical ones given by black-box PDE solvers; and/or amortize learning cost and hence are more effective than Bayesian optimization.

In order to guarantee convergence of learned surrogate in Langevin sampling one or more embodiments fit the unknown gradient of the black box constraints and not only the evaluations of those constraints. Deep learning of surrogate gradients is employed in one or more embodiments. One or more embodiments employ double back propagation to train deep models to fit their values and to regularize their gradients. We have found that, in order to obtain good candidates in constrained multi-objective optimization, sampling is more suitable than multi-start Bayesian optimization since it gives a distributions of candidates that can be further screened.

One or more embodiments cast black-box constrained multi-objective optimization as sampling from a Gibbs distribution. Sampling from this Gibbs distribution is done, for example, via surrogate-based Langevin dynamics. In Langevin sampling, we have found that it is important to have good estimates of the potential as well as its gradients. One or more embodiments provide surrogate gradient estimation. For example, a constrained zero order Langevin approach uses the zero-order estimate for the black box gradient. Deep surrogate of the gradients can be carried out, for example, via Hermite learning and/or Taylor learning. One or more embodiments are generally applicable to any inverse design problem with multiple black-box constraints. One or more embodiments have a significant advantage over Bayesian optimization in terms of speed and re-usability. For specific set of targeted properties, Bayesian optimization needs to be run from scratch. In contrast, one or more embodiments reuse the deep surrogate, which amortizes the cost of learning of the surrogate.

One or more embodiments address optimal inverse design for high-dimensional data with multiple black-box constraints. One or more embodiments have reduced computational costs as compared to prior art techniques, which have high computational costs, for example, due to simultaneous training of a large RNN model and evaluation of the black-box functions. Advantageously, one or more embodiments learn the surrogate gradient of the black-box function once without the need to construct an intractable dataset of sequences. The surrogate gradient optimization is then be much more efficient as compared to prior art techniques.

Furthermore, prior art techniques typically cannot handle constraints under multiple black-box functions. Advantageously, one or more embodiments only need to construct a non-sequential dataset and then use deep neural networks to efficiently approximate the gradient of the black-box functions (rather than the function itself). The learned network allows a fast gradient-based optimization process. One or more embodiments employ a data-driven approach to learn surrogate gradients of the black-box functions rather than the functions themselves.

One or more embodiments employ the surrogate gradients to perform optimization rather than re-fitting the black-box function again and again for each new starting point. We have found that learning universal surrogate gradients offline is more efficient than Bayesian optimization.

There is a prior art black box optimization method known as "gradientless descent." Gradientless descent is an iterative algorithm that optimizes a black-box function by adaptively sampling random search directions. The adaptivity is based on previous random directions. This gradientless descent algorithm is relatively expensive because it still requires many evaluations of the black-box function. This gradientless descent algorithm cannot deal with constrained optimization under multiple black-box functions. It is not clear how to apply adaptive sampling on multiple such functions. In contrast, one or more embodiments provide a data-driven approach that efficiently approximates the gradient of the black-box function (rather than the function itself) using deep networks. The learned network allows fast a gradient-based optimization process.

Figure 13:
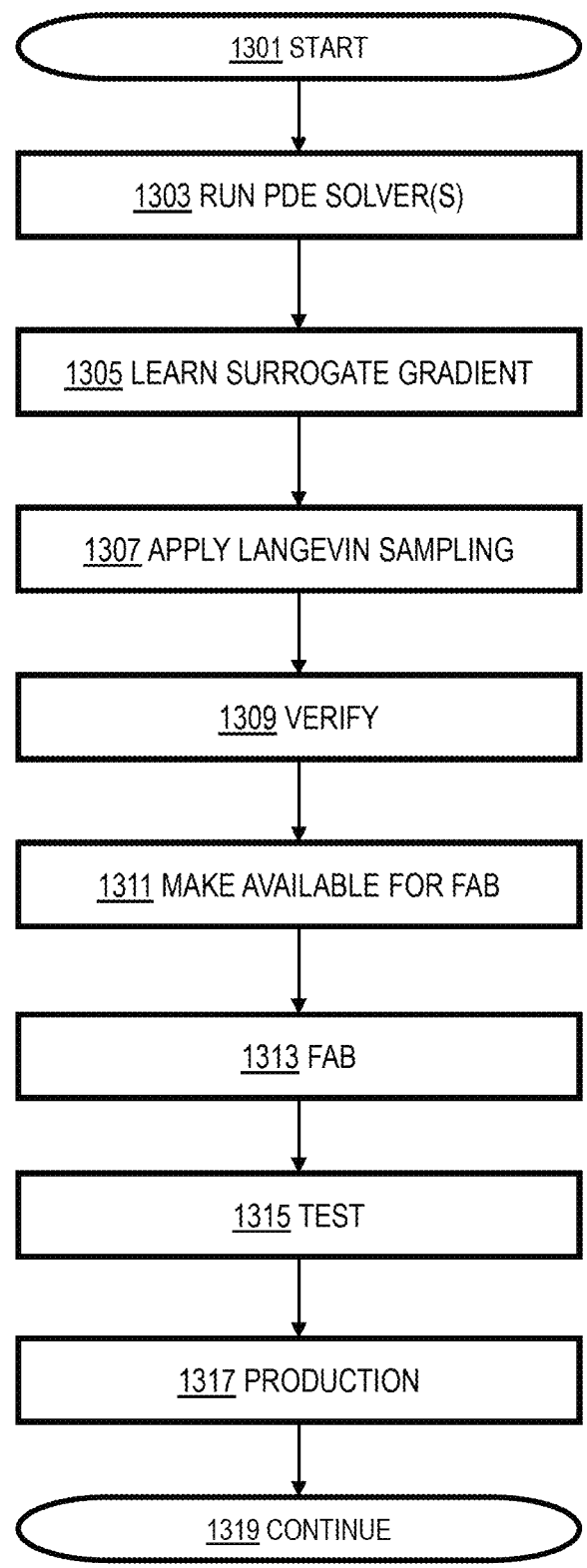
Figure 15:
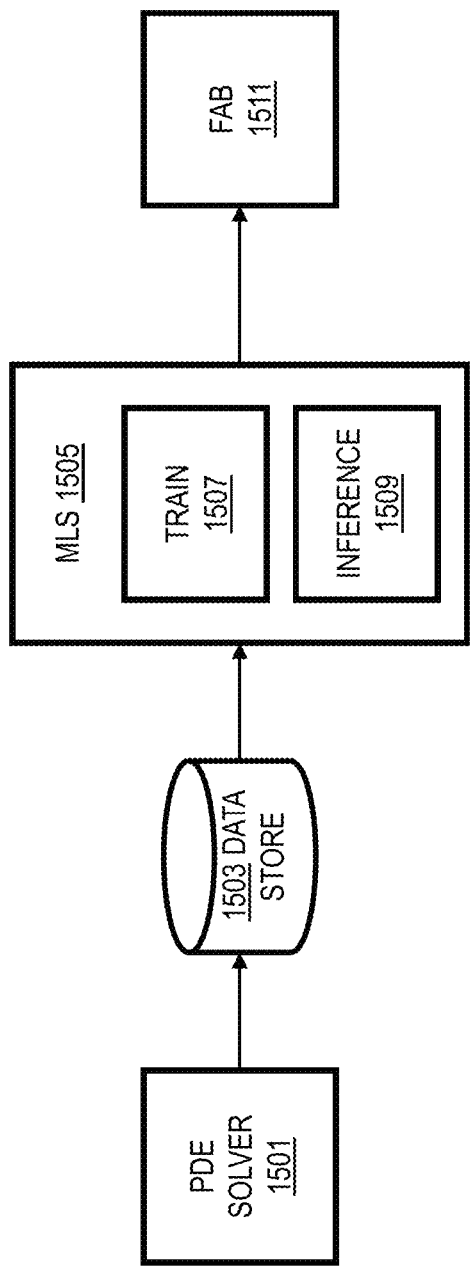
FIG. 15 is a block diagram according to embodiments of the present invention.

Given the discussion thus far, and referring to the flow chart of FIG. 13 which begins at 1301, and the block diagram of FIG. 15, it will be appreciated that, in general terms, an exemplary method, according to an aspect of the invention, includes step 1303, running a computerized numerical partial differential equation solver 1501 on at least one partial differential equation representing at least one physical constraint of a physical system, to generate a training data set, wherein a true potential corresponds to an exact solution to the at least one partial differential equation. Refer generally to the discussion of a Gibbs distribution $\pi(x)$ with unknown potential U(x). Refer now also to FIG. 11, 1101 and 1103. A further step 1305 includes, using a computerized machine learning system (MLS) 1505, learning, from the training data set, a surrogate of a gradient of the true potential. An even further step 1307 includes, using the computerized machine learning system, applying Langevin sampling to the learned surrogate of the gradient, to obtain a plurality of samples corresponding to candidate designs for the physical system. Still a further step 1311 includes making the plurality of samples available to a fabrication entity 1511.

Referring to FIG. 14, in a non-limiting example, learning the surrogate gradient includes: at 1321, fitting a surrogate model to the data via deep learning; and, at 1323, learning a gradient of the surrogate model to obtain the surrogate gradient.

The Langevin sampling can include, for example, projected Langevin dynamics as per Eq. 4 or proximal Langevin dynamics as per Eq. 5.

Learning the surrogate gradient can include, for example, zero order surrogate gradient estimation as per Eq. (12); Hermite learning as per Eq. (15); or any of the Taylor learning techniques disclosed herein (e.g., Taylor-Reg, Taylor-1, Taylor-2).

In one or more embodiments, the Langevin sampling is carried out subject to a plurality of equality and inequality constraints $\psi_j$, $\varphi_k$.

In some cases, the physical system includes a nano-material in which pores are to be distributed so as to satisfy the at least one physical constraint (see, e.g., FIGS. 5, 9, 10); and said at least one physical constraint includes minimum thermal conductivity ($\kappa$) subject to adequate mechanical stability ($\sigma$).

Figure 16:
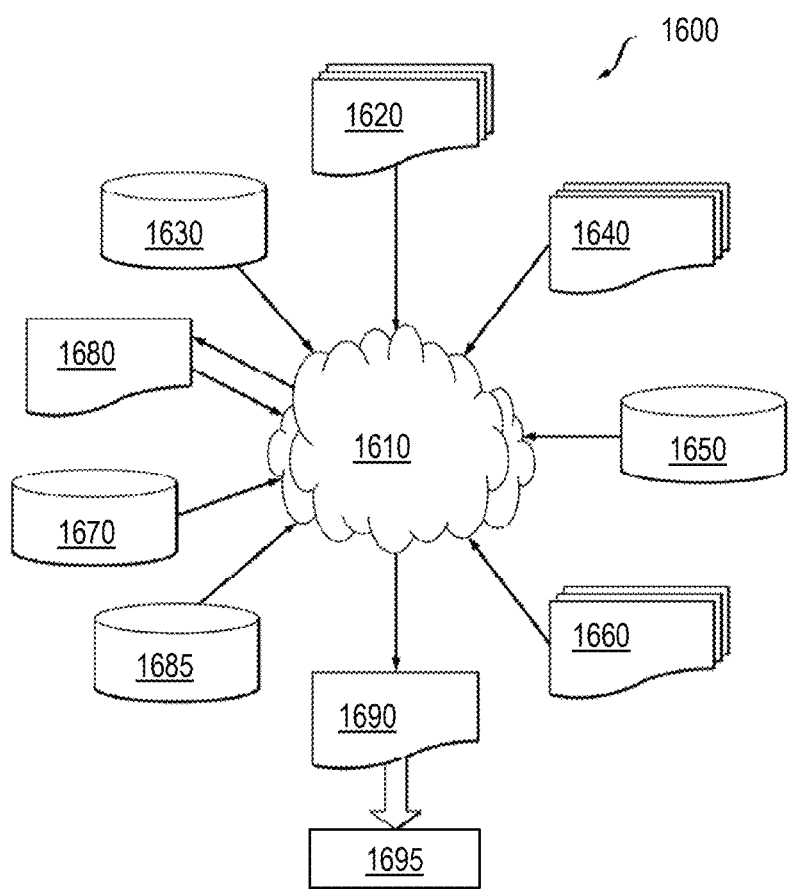
FIG. 16 is a flow diagram of a design process used in semiconductor design, manufacture, and/or test, also representative of techniques for nano material manufacturing.

One or more embodiments further include, at 1313, the fabrication entity fabricating a physical nano-material in accordance with at least one of the plurality of samples obtained from applying the Langevin sampling. The fabrication entity can be the same entity that carries out the ML steps or can be a different entity. For example, a data file characterizing the design can be sent to a fab/foundry or made available to the fab/foundry over a network. The skilled artisan will be familiar with both top-down and bottom up techniques for fabricating nanostructures; for example, lithographic and etching techniques can be used as in semiconductor manufacturing as discussed elsewhere herein (FIG. 16 and accompanying text). Samples can be tested prior to full scale production 1317, as at step 1315. Candidate designs can be verified prior to fabrication using finite element analysis or the like, as at 1309. The method continues at 1319 (e.g. wait for next run)

As noted, one advantage of one or more embodiments is that computationally intensive numerical solvers for PDEs are run "once for all" to generate the training data and it is not necessary to subsequently use such computationally intensive numerical solvers. Thus, one or more embodiments include refraining from numerically solving the at least one partial differential equation, subsequent to generating the training data set (or at least other than in a candidate design verification, which is in any case not an inverse design but an affirmative analysis of a candidate design).

Exemplary PDEs that can be solved include the Boltzmann transport equation and the continuum linear elasticity Equation. For example, use the OpenBTE solver for Boltzmann and a finite element program such as ANSYS® software (registered mark of ANSYS, INC. CANONSBURG, Pa.) for linear elasticity.

Thus, in one or kore embodiments, a data set is acquired by running a numerical PDE solver. The PDEs represent physical constraints of a physical system—e.g. desire a (nano) material to be designed to satisfy those constraints (stress, electrical conduction, thermal conduction, and the like). The PDEs are numerically solved on many random samples to obtain a training data set—one or more embodiments then do not require any further use of PDE solvers (or only for a non-inverse candidate design verification). Use, for example, deep learning to train on the training data set and fit a surrogate model (using, e.g., Taylor techniques). One or more embodiments fit a different surrogate for each desired property. Run Langevin sampling on the surrogate to obtain candidate designs that satisfy constraints an (inference step). Fabricate samples (typically, a subset of the candidates), test, and pick a final design. Send a data file characterizing the design(s) to a fab or make it available over a network.

One or more embodiments include a database or other data store 1503, PDE solver 1501, and an ML system 1505. A first component 1507 of the ML system includes a training component to learn the surrogate, while a second component 1509 of the ML system is an inference or sampling component. The ML components use the corresponding equations disclosed herein. One or more embodiments obtain a training set from solving PDE(s) offline. One or more embodiments speed up performance of a computer performing the design process by using the neural network instead of solving PDEs once the initial training is complete. One or more embodiments thus provide techniques for reducing computational complexity in the design of nanomaterials or the like. The data store can store the results of the PDE solver and other desired data.

In another aspect, an exemplary system includes a memory (e.g. 30, discussed elsewhere); optionally, a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, as seen in FIG. 15. Furthermore, a computer program product can be provided that when executed, instantiates the components and carries out or otherwise facilitates one, some, or all of the method steps.

Figure 17:
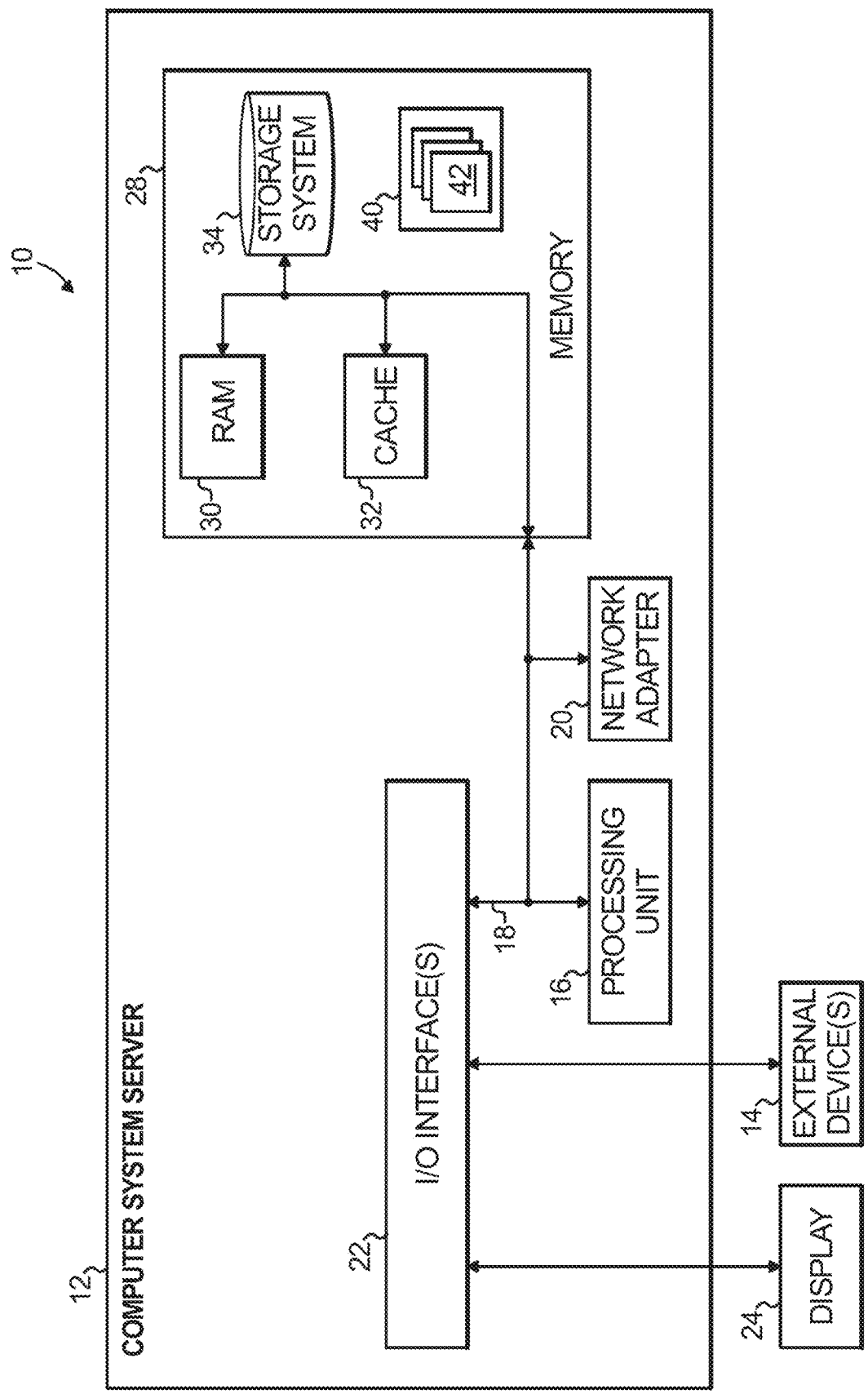
FIG. 17 depicts a computer system that may be useful in implementing one or more aspects and/or elements of the invention, also representative of a cloud computing node according to an embodiment of the present invention.

One or more embodiments of the invention, or elements thereof, can accordingly be implemented in the form of an apparatus/system including a memory and at least one processor that is coupled to the memory and operative to perform exemplary method steps. FIG. 17 depicts a computer system that may be useful in implementing one or more aspects and/or elements of the invention, also representative of a cloud computing node according to an embodiment of the present invention. Referring now to FIG. 17, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 17, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 17) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to provide deep surrogate Langevin sampling for multi-objective constraint black box optimization with applications to optimal inverse design problems and the like, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Exemplary Design Process Used in Semiconductor Design, Manufacture, and/or Test

FIG. 16 shows a block diagram of an exemplary design flow 1600 used for example, in semiconductor IC logic design, simulation, test, layout, and manufacture, applicable to aspects of nano-structure fabrication based on designs developed as described herein. Design flow 1600 includes processes, machines and/or mechanisms for processing design structures or devices to generate logically or otherwise functionally equivalent representations of design structures and/or devices, such as those that can be analyzed using SSTA or the like. The design structures processed and/or generated by design flow 1600 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1600 may vary depending on the type of representation being designed. For example, a design flow 1600 for building an application specific IC (ASIC) may differ from a design flow 1600 for designing a standard component or from a design flow 1600 for instantiating the design into a programmable array, for example a programmable gate array (PGA) or a field programmable gate array (FPGA) offered by Altera® Inc. or Xilinx® Inc.

FIG. 16 illustrates multiple such design structures including an input design structure 1620 that is preferably processed by a design process 1610. Design structure 1620 may be a logical simulation design structure generated and processed by design process 1610 to produce a logically equivalent functional representation of a hardware device. Design structure 1620 may also or alternatively comprise data and/or program instructions that when processed by design process 1610, generate a functional representation of the physical structure of a hardware device. Whether representing functional and/or structural design features, design structure 1620 may be generated using electronic computer-aided design (ECAD) such as implemented by a core developer/ designer. When encoded on a gate array or storage medium or the like, design structure 1620 may be accessed and processed by one or more hardware and/or software modules within design process 1610 to simulate or otherwise functionally represent an electronic component, circuit, electronic or logic module, apparatus, device, or system. As such, design structure 1620 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1610 preferably employs and incorporates hardware and/or software modules for synthesizing, translating, or otherwise processing a design/simulation functional equivalent of components, circuits, devices, or logic structures to generate a Netlist 1680 which may contain design structures such as design structure 1620. Netlist 1680 may comprise, for example, compiled or otherwise processed data structures representing a list of wires, discrete components, logic gates, control circuits, I/O devices, models, etc. that describes the connections to other elements and circuits in an integrated circuit design. Netlist 1680 may be synthesized using an iterative process in which netlist 1680 is resynthesized one or more times depending on design specifications and parameters for the device. As with other design structure types described herein, netlist 1680 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 1610 may include hardware and software modules for processing a variety of input data structure types including Netlist 1680. Such data structure types may reside, for example, within library elements 1630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1640, characterization data 1650, verification data 1660, design rules 1670, and test data files 1685 which may include input test patterns, output test results, and other testing information. Design process 1610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1610 without deviating from the scope and spirit of the invention. Design process 1610 may also include modules for performing standard circuit design processes such as timing analysis, verification, design rule checking, place and route operations, etc. Improved timing analysis can be performed as described herein.

Design process 1610 employs and incorporates logic and physical design tools such as HDL compilers and simulation model build tools to process design structure 1620 together with some or all of the depicted supporting data structures along with any additional mechanical design or data (if applicable), to generate a second design structure 1690. Design structure 1690 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1620, design structure 1690 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 1690 may comprise a compiled, executable HDL simulation model that functionally simulates the devices to be analyzed.

Design structure 1690 may also employ a data format used for the exchange of layout data of integrated circuits and/or symbolic data format (e.g. information stored in a GDSII (GDS2), GL1, OASIS, map files, or any other suitable format for storing such design data structures). Design structure 1690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1690 may then proceed to a stage 1695 where, for example, design structure 1690: proceeds to tape-out, is released to manufacturing, is released to a mask house, is sent to another design house, is sent back to the customer, etc.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
running a computerized numerical partial differential equation solver on at least one partial differential equation representing at least one physical constraint of a physical system, wherein said physical system comprises a nano-material to generate a training data set, wherein a true potential corresponds to an exact solution to said at least one partial differential equation;
using a computerized machine learning system, learning, from said training data set, a surrogate of a gradient of said true potential, wherein said learning of said surrogate gradient comprises fitting a surrogate model to said data via deep learning, and learning a gradient of said surrogate model to obtain said surrogate gradient;
using said computerized machine learning system, applying Langevin sampling to said learned surrogate of said gradient, to obtain a plurality of samples corresponding to candidate designs for said physical system, wherein pores are to be distributed in said nano-material so as to satisfy said at least one physical constraint, and said at least one physical constraint comprises minimum thermal conductivity subject to adequate mechanical stability;
verifying at least one of said candidate designs prior to fabrication;
refraining from numerically solving said at least one partial differential equation, subsequent to generating said training data set, other than verifying said at least one of said candidate designs prior to said fabrication;
making said plurality of samples available to a fabrication entity; and
fabricating, by said fabrication entity, a physical nano-material in accordance with at least one said plurality of samples obtained from applying said Langevin sampling.

2. The method of claim 1, wherein said Langevin sampling comprises projected Langevin dynamics.

3. The method of claim 1, wherein said Langevin sampling comprises proximal Langevin dynamics.

4. The method of claim 1, wherein learning said surrogate gradient comprises zero order surrogate gradient estimation.

5. The method of claim 1, wherein learning said surrogate gradient comprises Hermite learning.

6. The method of claim 1, wherein learning said surrogate gradient comprises Taylor learning.

7. The method of claim 1, wherein said Langevin sampling is carried out subject to a plurality of equality and inequality constraints.

8. An apparatus comprising:
a memory; and
at least one processor, coupled to said memory, and operative to:
run a computerized numerical partial differential equation solver on at least one partial differential equation representing at least one physical constraint of a physical system, wherein said physical system comprises a nano-material, to generate a training data set, wherein a true potential corresponds to an exact solution to said at least one partial differential equation;
using a computerized machine learning system executing on said at least one processor, learn, from said training data set, a surrogate of a gradient of said true potential, wherein said learning of said surrogate gradient comprises fitting a surrogate model to said data via deep learning, and learning a gradient of said surrogate model to obtain said surrogate gradient;
using said computerized machine learning system, apply Langevin sampling to said learned surrogate of said gradient, to obtain a plurality of samples corresponding to candidate designs for said physical system, wherein pores are to be distributed in said nano-material so as to satisfy at least one physical constraint, and said at least one physical constraint comprises minimum thermal conductivity subject to adequate mechanical stability;
using said computerized machine learning system, verifying at least one of said candidate designs prior to fabrication;
using said computerized machine learning system, refraining from numerically solving said at least one partial differential equation, subsequent to generating said training data set, other than verifying said at least one of said candidate designs prior to said fabrication;
make said plurality of samples available to a fabrication entity; and
fabricating, by said fabrication entity, a physical nano-material in accordance with at least one of said plurality of samples obtained from applying said Langevin sampling.

9. A non-transitory computer readable medium comprising computer executable instructions which when executed by a computer cause the computer to perform a method of:
instantiating a numerical partial differential equation solver and a machine learning system;
running said numerical partial differential equation solver on at least one partial differential equation representing at least one physical constraint of a physical system, wherein said physical system comprises a nano-material, to generate a training data set, wherein a true potential corresponds to an exact solution to said at least one partial differential equation;
using said machine learning system, learning, from said training data set, a surrogate of a gradient of said true potential;
using said machine learning system, applying Langevin sampling to said learned surrogate of said gradient, to obtain a plurality of samples corresponding to candidate designs for said physical system, wherein pores are to be distributed in said nano-material so as to satisfy said at least one physical constraint, and said at least one physical constraint comprises minimum thermal conductivity subject to adequate mechanical stability;
using said machine learning system, verifying at least one of said candidate designs prior to fabrication;
using said machine learning system, refining from numerically solving said at least one partial differential equation, subsequent to generating said training data set, other than verifying said at least one of said candidate designs prior to said fabrication;
making said plurality of samples available to a fabrication entity; and fabricating, by said fabrication entity, a physical nanomaterial in accordance with at least one of said plurality of samples obtained from applying said Langevin sampling.

* * * * *